United States Patent
Brailovskiy et al.

(10) Patent No.: US 10,447,926 B1
(45) Date of Patent: Oct. 15, 2019

(54) MOTION ESTIMATION BASED VIDEO COMPRESSION AND ENCODING

(71) Applicant: Amazon Technologies, Inc., Seattle, WA (US)

(72) Inventors: Ilya Vladimirovich Brailovskiy, Mountain View, CA (US); Manuel Rosendo Arana Manzano, San Jose, CA (US); Marcus-Alan Gilbert, Plano, TX (US); Kenneth James Albanowski, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 492 days.

(21) Appl. No.: 14/745,291

(22) Filed: Jun. 19, 2015

(51) Int. Cl.
*H04N 5/232* (2006.01)
*H04N 5/247* (2006.01)

(52) U.S. Cl.
CPC ..... *H04N 5/23238* (2013.01); *H04N 5/23258* (2013.01); *H04N 5/23267* (2013.01); *H04N 5/247* (2013.01)

(58) Field of Classification Search
CPC .................................................. H04N 5/23238
See application file for complete search history.

(56) References Cited

U.S. PATENT DOCUMENTS

| | | | |
|---|---|---|---|
| 2004/0135907 A1 | 7/2004 | Krohn et al. | |
| 2006/0126738 A1* | 6/2006 | Boice | G01S 3/7862 375/240.16 |
| 2008/0004073 A1* | 1/2008 | John | H04N 5/23248 455/556.1 |
| 2010/0097443 A1* | 4/2010 | Lablans | G03B 37/00 348/36 |
| 2010/0265313 A1 | 10/2010 | Liu et al. | |
| 2013/0021491 A1 | 1/2013 | Lee et al. | |
| 2014/0192144 A1* | 7/2014 | St. Clair | H04N 5/23238 348/36 |
| 2015/0256808 A1* | 9/2015 | MacMillan | G03B 37/04 348/43 |
| 2015/0281580 A1* | 10/2015 | Karpenko | H04N 5/23264 348/208.2 |

(Continued)

OTHER PUBLICATIONS

Office action for U.S. Appl. No. 14/745,305, dated Oct. 26, 2016, Brailovskiy et al., "Motion Estimation Based Video Stabilization", 16 pages.

(Continued)

*Primary Examiner* — Anner N Holder
*Assistant Examiner* — Hesham K Abouzahra
(74) *Attorney, Agent, or Firm* — Lee & Hayes, P.C.

(57) ABSTRACT

A video capture device may include multiple cameras that simultaneously capture video data. The video capture device may include one or more motion sensors that track the motion of the video capture device during video capture. Using the motion data, motion vectors can be calculated and used by an encoder to compress and encode a stream of video data. The motion vectors calculated for one stream of video data can then be used to compress and encode a second stream of video data due to the symmetry of a first camera that captured the first video stream and a second camera that captured the second video stream. The video capture device and/or remote computing resources may stitch together the first and second video streams to generate a panoramic video.

20 Claims, 8 Drawing Sheets

(56) References Cited

U.S. PATENT DOCUMENTS

2016/0055381 A1* 2/2016 Adsumilli .......... G06K 9/00751
386/241

OTHER PUBLICATIONS

Office action for U.S. Appl. No. 14/745,305, dated Feb. 14, 2017, Brailovskiy et al., "Motion Estimation Based Video Stabilization", 16 pages.

"Meet the V.360," VSN Mobil, retrieved from <<https://www.vsnmobil.com/products/v360>> on Jun. 19, 2015, 1 page.

Office action for U.S. Appl. No. 14/745,305, dated Apr. 14, 2016, Brailovskiy et al., "Motion Estimation Based Video Stabilization", 16 pages.

Office action for U.S. Appl. No. 14/745,305, dated Jul. 6, 2017, Brailovskiy et al., "Motion Estimation Based Video Stabilization", 19 pages.

Office Action for U.S. Appl. No. 14/745,305, dated Mar. 2, 2018, Brailovskiy, "Motion Estimation Based Video Stabilization", 24 pages.

* cited by examiner

MOTION ESTIMATION BASED VIDEO COMPRESSION AND ENCODING

BACKGROUND

Panoramic video may be generated by stitching together video data captured by multiple cameras. However, relying on video data provided by multiple cameras to create a panoramic video presents some challenges. One of the unique challenges inherent in multiple camera video capture devices arises from unwanted camera movement. Unwanted camera movement results in a shaky video and resulting difficulty when encoding the video. This leads to the possibility of new technology enabling novel systems and techniques for generating, compressing, and/or encoding video captured by a camera.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
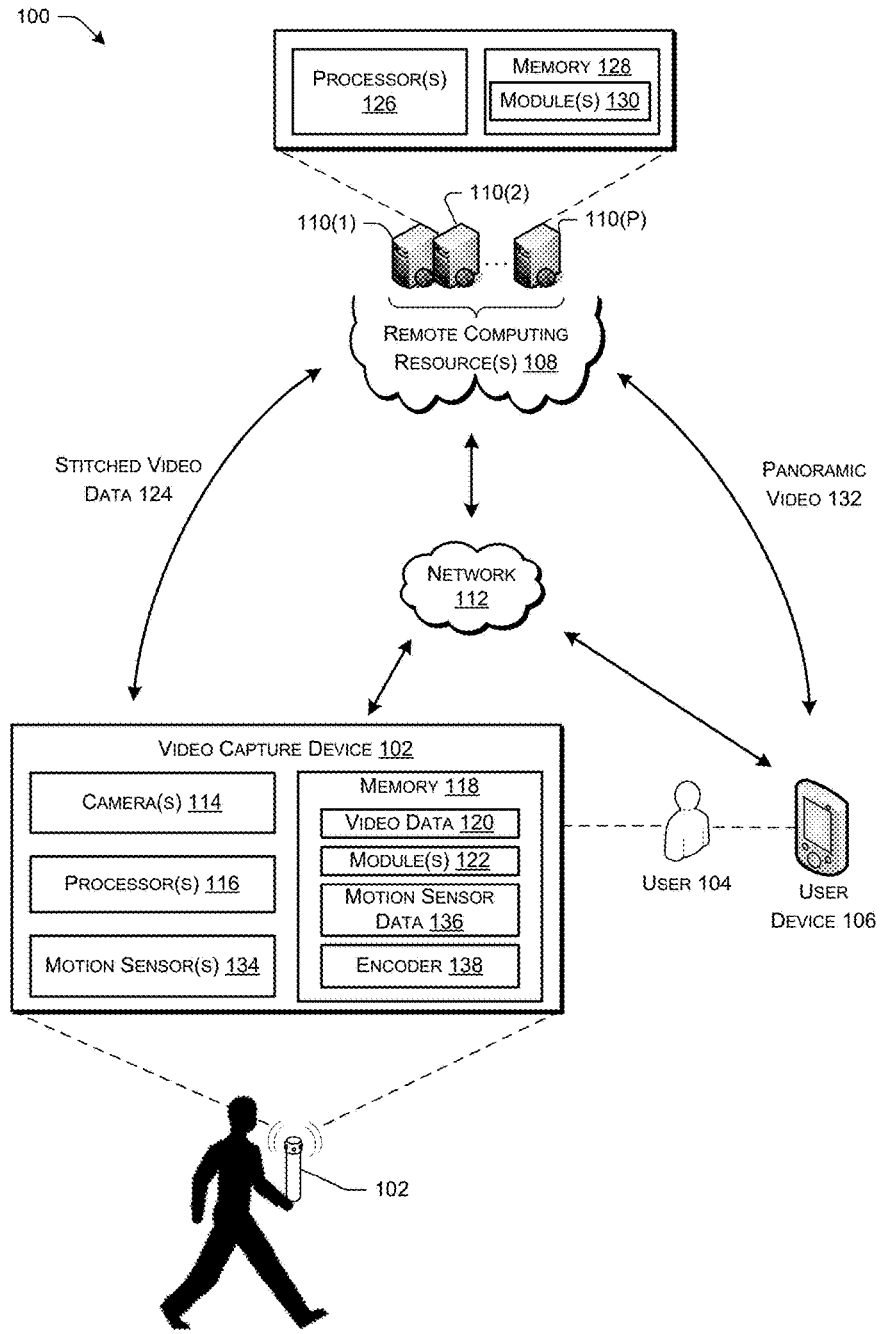
FIG. 1 illustrates an example system for generating a video stabilized panoramic video based on video data captured by multiple cameras of a video capture device.

The systems and/or processes described herein may generate a motion stabilized panoramic video from video data captured by multiple cameras of a video capture device. More particularly, unlike existing cameras, the systems and/or processes described herein correspond to a video capture device having multiple cameras (e.g., four cameras) that each simultaneously capture video data of the surrounding environment. As a result, instead of capturing video data of a single field of view, such as a field of view in which the camera is facing, each of the multiple cameras of the video capture device described herein may simultaneously capture video data corresponding to multiple, different fields of view. Accordingly, provided that the video capture device included four or more different cameras that each capture video data, the video capture device may be configured to capture up to a 360° video and/or a 360° image, or any desired field of view less than 360°.

The systems and/or processes described herein may include motion sensors (e.g., gyroscopes, accelerometers, or others) that can be configured to generate motion data related to the video capture device during video capture. The motion sensor data can be analyzed and used to adjust the video data to account for unwanted camera shake and can further be used in a motion compensation calculation for video encoding. For example, the motion sensor data can be utilized to adjust the frames of video data, and more particularly, can be utilized to adjust pixels within the frames of video data, to adjust the pixels to account for unwanted shaking, jittering, or movement of the video capture device. Stabilization algorithms can be executed on the video data captured by a single camera to generate stabilizing adjustments to a video stream, and the stabilizing adjustments calculated for a single video stream can then be used to apply stabilizing adjustments to video data captured by other cameras of the video capture device. Additionally, the motion sensor data can be used to calculate motion vectors of the video frames to maximize efficiency of encoding the video streams. For purposes of this discussion, motion vectors are vectors that are representative of the direction and magnitude of camera movement, and can be calculated based upon the motion sensor data and used to reduce or remove the unwanted effects of the camera shaking during video capture.

The process of encoding the video streams compresses the digital video file by using the information redundancy in the input file to reduce the size of the output file. The differences between a reference frame of video and the subsequent frame of video are due to either (1) movement of the camera, or (2) movement of the subjects depicted in the video frames. Motion estimation is the process of determining the motion of the video capture device during video capture, and calculating motion vectors that correspond to the camera movement during video capture. Motion compensation is the process of using the motion estimation calculation to predict the transformation in subsequent frames of video data based on camera movement. This prediction is used by a video encoder to reduce the size of the output file by only storing the information needed to transform from one frame to the next frame.

For a stationary camera capturing video frames, the differences from frame to frame due to subject movement are typically very small, resulting in a significant amount of data redundancy from one frame to the next. Consequently, motion compensation can significantly reduce the size of the output file.

Upon the multiple cameras capturing the video data, the video capture device and/or one or more remote computing resources (e.g., a server device) may encode the video streams using the motion sensor data, execute stabilization algorithms to apply stabilization to each stream of video data, and then stitch together the video data.

The multiple cameras of the video capture device may be disposed symmetrically about a central axis of the video capture device. For example, in a system having four cameras, the first and third cameras may be pointed in opposite directions to one another, while the second and fourth cameras may be diametrically opposed. That is, each of the four cameras is pointing in a direction that is approximately 90° from its adjacent camera in the video capture system. Of course, a video capture system may employ more than four cameras, such as six cameras, in which case to maintain symmetry, the six cameras are each disposed in a direction that is approximately 60° from its neighboring camera in the video capture device. Of course, a video capture device may employ any number of cameras, such as two, three, five, six, eight, ten, or more.

The video capture device may include one or more inertial measurement units (IMUs), such as motion sensors, configured to provide motion information about the video capture device to the video capture device and/or one or more remote computer resources. For example, suitable IMUs may include one or more accelerometers, gyroscopes, compasses, or other general measurement units. The data generated by the IMUs can be used to apply algorithms to the video data that is captured by the multiple cameras of the video capture device. In some instances, the IMU data can be used for motion estimation and compensation during encoding of the video data and also for video stabilization by understanding the rotational and translational movement of the video capture device at the time when it is capturing video data.

In some embodiments, the video data from one camera may have algorithms applied to it in order to calculate motion vectors based on unwanted camera movement which can be used for motion compensation and/or to stabilize the video, and the resulting output of the algorithms may be applied to other video data captured by another camera without having to execute the algorithms with respect to the other video data. As an example, such as in a video capture device having four cameras evenly spaced around the device, the video data from camera 1 may be analyzed using any of a number of motion estimation techniques that utilize the IMU sensor data to apply algorithms to the video data captured by camera 1. The motion estimation calculations based on the video frames contained within the video data captured by camera 1 can then be applied to (or used to extrapolate) the motion compensation and/or stabilization adjustments to video frames contained within the video data captured by the camera that is opposite to camera 1 (i.e., camera 3).

More specifically, the video frames may contain metadata associated with some or all of the frames. The metadata may include information such as a frame number, identification of the camera that captured the frames, a time stamp, a scene identifier, a template, settings of the video capture device, exchangeable image file format data (EXIF data), and other information that may be useful in the subsequent stitching and/or processing of the video frames. In addition, the motion estimation calculations made to each frame of the video data captured by camera 1 can be stored for later use, and may be stored along with the metadata, or may be stored elsewhere. The video frames captured by a different camera can be correlated with the video frames captured by camera 1, such as by matching up the frame number, the time stamp, or some other method.

The motion estimation calculations associated with the video frames captured by camera 1 can then be applied to the video frames captured by a different camera. For instance, where camera 1 and camera 3 are opposite from one another (e.g., having fields of view that are approximately 180° apart), the motion estimation calculations made to the video frames captured by camera 1 can be modified and applied to the video frames captured by camera 3. For example, the motion estimation calculations can be used to determine stabilization adjustments for the video frames captured by camera 1 in response to camera 1 tilting upward. The opposite stabilization adjustments can be made to the corresponding video frames captured by camera 3 (as a result of camera 3 tilting downwards). The same is true of the motion compensation calculations. For example, when calculating the motion vectors for the video frames captured by camera 1 in response to camera 1 tilting upward, the opposite motion vector will apply to video frames captured by camera 3. The motion vectors can then be used to compensate for the motion during the encoding process, which seeks to minimize the information redundancy in the digital video file.

Because of the fixed and symmetrical orientation of the various cameras within the video capture device, it stands to reason that when camera 1 tilts upwardly, the opposite camera, camera 3 in this example, tilts downwardly. Similarly, where camera 1 moves closer to a subject within its field of view, the subject within the field of view of camera 3 becomes further away.

In many cases, utilizing video capture device motion data from the IMU sensors provides much more efficient and superior encoding and stabilization effects when compared with other techniques that do not rely on motion sensor data. Additionally, the panoramic video that results from the video data captured by the multiple cameras of the video capture device will be of superior quality because the motion data allows the video frames to be stitched and blended more efficiently, while reducing unwanted artifacts.

Once the algorithms are executed on the video data from camera 1, the computation of motion vectors based upon the video data of camera 1 can be applied directly to the video data of camera 3 (a diametrically opposing camera to that of camera 1), and the video data captured by camera 3 can be stabilized and encoded without having to again execute or run the motion compensation and stabilizing algorithms. The result is a much more efficient operation since the symmetry of the device allows the motion vector calculations for one video stream to be applied to another video stream without having to execute the calculations again. Such a process results in better battery life, fewer required computations, faster panoramic video generation times, improved stitching of video streams, and a smaller form factor, among other benefits.

Of course, the motion estimation algorithms may only be executed for a portion of the captured video data, or may be executed for an entire stream of video data, but the stabilization adjustments may only be applied to a portion of the captured video data. For example, a video capture device may capture video data over a certain time period. A portion of that video data may be stabilized and/or encoded and made available to share, such as by uploading to one or more remote computing resources. Moreover, a portion of the video may be stabilized and/or encoded and made available as a summary of the larger video file. That is, a video summarization of the video data may include various video segments/frames of the video data (e.g., portions of the video data that are determined to likely be of interest to a user), but may be shorter in duration (e.g., five minutes) than a total duration of the video data (e.g., one hour). Instead of stabilizing, encoding, and/or compressing an entirety of the video data, such operations/processing may only be performed on the video summarization itself. Moreover, the stabilizing and/or encoding of the video data may be performed by the video capture device, by the remote computing resources, or a combination of both.

FIG. 1 illustrates an example system 100 that is configured to generate panoramic video from video data captured from multiple cameras of a video capture device 102 (interchangeably referred to as "device"). The video capture device 102 may be included in an environment, such as a home environment, as illustrated in FIG. 1, or in any other environment (e.g., an outdoors environment). The video capture device 102 may be placed in a fixed location within the environment, such as on a table, on a mount or stand, or may be carried by a user 104. In various embodiments, the user 104 may have one or more other user devices 106, which may be used to perform various operations. Here, the user device 106 may be utilized by the user 104 to receive panoramic image(s)/video generated by the system 100. In addition to the video capture device 102, the system 100 may include one or more remote computing resource(s) 108, which may be implemented as one or more servers 110(1), 110(2), . . . , 110(P), and one or more networks 112.

As illustrated in FIG. 1, the video-capture device 102 may include at least one or more cameras 114, one or more processors 116, one or more motion sensors 134, and memory 118. The memory 118 may store video data 120 captured by the cameras 114, one or more modules 122 that perform various operations, motion sensor data 136 detected and/or generated by the one or more motion sensors 134, and one or more encoders 138 for encoding the video data 120. In various embodiments, each of the cameras 114 of the video capture device 102 may capture video data 120, such as a stream of video, as well as still images. As used herein, a video stream is video data 120 captured from a single camera of the video capture device. Multiple video streams may be stitched together to create stitched video data and a panoramic video. For instance, provided that the video-capture device 102 included four different cameras 114, each of the four cameras 114 may capture a different video stream corresponding to a field of view. The cameras 114 may be positioned on each side of the video capture device 102, such that each camera 114 is positioned 90° with respect to adjacent cameras 114 (e.g., cameras 114 to the left and the right). That is, a first axis in which a first camera 114 is oriented may be approximately 90° from a second axis in which adjacent cameras 114 are oriented. Since the field of view of a first camera 114 may overlap with the field of views of adjacent cameras 114, the multiple cameras 114 of the video capture device 102 may capture 360° of video, which will be discussed in additional detail with respect to FIG. 2.

In some instances, a video capture device 102 will capture multiple streams of video data 120 through multiple cameras 114 at the same time. The multiple streams of video data 120 will comprise a series of video frames, or still images, that are arranged sequentially to form the video data 120. Generally speaking, the stitching process matches frames from one stream of video data 120 with frames from another stream of video data 120 and joins the frames together to create stitched video data. The frames of video data 120 are generally rectangular and have the shape of an imaging sensor with pixels arranged in rows and columns. The frames of video data 120 may include a time stamp that allows a frame of video data 120 captured by a first camera 114 to be matched with a frame of video data 120 captured by a second camera 114 that has a nearly identical time stamp. The frames of video data 120, when captured by cameras that have an overlapping field of view, will have portions that are common. That is, the overlapping field of view of the cameras 114 will each capture a substantially similar view of the scene. The overlapping portions of each frame of video data 120 can be used to join one frame to another frame by overlapping the common portions of the scene captured by each camera 114. If necessary, the boundary where the two frames are joined can be blended, smoothed, or otherwise modified to create a smooth transition between the frames of video data 120. Typically, the frames of video data 120 will have a top edge, bottom edge, and side edges, and the frames of video data 120 may be joined along their side edges to form a panoramic image or a panoramic video.

Moreover, instead of the video capture device 102 including multiple cameras 114, the video capture device 102 may capture 360° video using a single camera 114 that rotates about the video capture device 102 at a high rate/speed, or is otherwise capable of capturing up to a 360° video.

The cameras 114 of the video capture device 102 may capture video data 120 of the environment surrounding the video capture device 102. The video capture device 102 may be set on a surface within an environment, which may allow the multiple cameras 114 to capture video of the environment. For instance, the video capture device 102 may be set on a table within a room of a home to capture video of activity (e.g., a birthday party) taking place within the room. Due to multiple cameras 114 simultaneously capturing video, the video capture device 102 may capture video in multiple different directions, thereby capturing video of an entirety of the events taking place within the room, provided that those events are within the field of view of at least one of the cameras 114. The video capture device 102 may also be held by the user 104, or may be affixed the user 104 in some manner (e.g., via a strap, a clip, a platform, etc.). Accordingly, as the user 104 moves within an environment (e.g., a room, the beach, a hike in the mountains, etc.), the video capture device 102 may capture video of events occurring within that environment. The cameras 114 may continuously capture video, or may begin/cease capturing video in response to user input (e.g., actuating a button, a voice command, etc.).

As stated above, the video data 120 may represent video captured by each of the multiple cameras 114 of the video capture device 102. The one or more modules 122 of the video capture device 102 may include software and/or other functionality that may adjust the video data 120 and may also stitch together the video data 120 captured by the multiple cameras 114. That is, provided that the video data 120 is captured by four different cameras 114, the modules 122 may perform adjustments to the video data, such as to correct for camera 114 movement during video data 120 capture. The one or more modules 122 may also stitch video data 120 captured by a first camera 114 with the video data 120 captured by cameras 114 adjacent to the first video camera 114. As a result, stitching of the video data 120 may result in image-stabilized stitched video data 124, where the stitched video data 124 is 360° video that depicts the environment surrounding the video capture device 102. The stabilization and/or the stitching of the video data 120 may also be performed by the remote computing resources 108, or by a combination of the video capture device 102 and the remote computing resources 108, and is discussed in additional detail with respect to FIG. 2.

In other embodiments, the modules 122 may include speech recognition software or other speech recognition functionality. The video capture device 102 may include one or more microphones that detect voice commands uttered by the user 104 and that generate one or more audio signals corresponding to the voice commands. The speech recognition software may process the audio signals to recognize words included within the voice command. As a result, the video capture device 102 may recognize voice commands uttered by the user 104 (e.g., start recording video, stop recording video, take a photograph, etc.) and perform corresponding operations as a result (e.g., instruct the cameras 114 to record video, instruct the cameras 114 to cease recording video, instruct the cameras 114 to capture a still image, etc.). The video capture device 102 may include one or more user interfaces (e.g., graphical user interfaces) and/or one or more speakers that allow the video capture device to visually and/or audibly output information to the user 104, which may allow the user 104 to interact with the video capture device 102.

The motion sensors 134 of the video capture device 102 may be any suitable sensor designed to capture, generate, or otherwise provide data that may be useful to the system 100. In one instance, the motion sensors 134 may include motion sensors, such as inertial measurement units (IMUs). More specifically, the motion sensors 134 may include one or more gyroscopes, accelerometers, etc. Additionally, the motion sensors 134 may include location/position sensors such as one or more compasses, global positioning devices, and the like.

The motion sensors 134 can be configured to track and store motion sensor data 136 that indicates the position, orientation, movement, etc., of the video capture device 102. For example, when the video capture device is moving while it is capturing video, such as while it is being held by a user 104, mounted to a moving platform such as a vehicle, attached to the user 104, or otherwise subject to motion, the motion sensor data 136 will include information that may correspond to rotational and/or translational motion of the video capture device 102.

As the video capture device 102 is capturing video data 120 while the video capture device 102 is not in a fixed, stationary position, there will be some amount of shaking, jerking, oscillation, or other small movements that will be reflected in the video data 120. The motion sensors 134 may be able to detect this motion and provide motion sensor data 136 (e.g., motion data) that can be used to adjust the video data 120 to account for this motion.

The motion sensor data 136 may be utilized by the encoder 138 to encode the video data 120 at the video capture device 102, and/or may be sent to the remote computing resources 108 for utilization with one or more stabilization algorithms. The motion sensor data 136 may include information relating to the time that the video capture device 102 was operably capturing video data 120, which may facilitate associating the motion sensor data 136 with frames of video data 120 and be used to shift the pixels within the frames of video data 120. For example, if during a period of time of video data capture, the motion sensors 134 detected that the camera rotated upward by two degrees over a period of one tenth of a second, this motion sensor data 136 can be associated with the frames of video data 120 that were captured during the relevant tenth of a second time period.

Where the video capture device 102 is capturing video data 120 at a rate of thirty frames per second, there may be three sequential frames of video data 120 captured during the tenth of a second that will manifest the video capture device 102 movement by showing corresponding pixels within the three frames moving downwardly with each successive frame of video data 120.

The motion sensor data 136 can be used to apply an adjustment to the affected frames of the video data 120. Continuing with the previous example, the initial frame may be a reference frame, and the motion sensor data 136 can be used to indicate that the subsequent two frames were subject to camera shake as the video capture device 102 tilted upwards by two degrees over a time period of a tenth of a second. Either the video capture device 102, or the remote computing resources 108, can execute one or more stabilization algorithms to calculate the distance the corresponding pixels shifted from frame to frame, and the frames of video data 120 may be adjusted by shifting all the pixels within the frames to account for the unwanted video capture device 102 motion. The motion sensor data 136 may also be used by the encoder 138 to compensate for the motion of the video capture device 102.

In some instances, the video capture device 102 may operate in conjunction with or may otherwise utilize computing resources that are remote from the video capture device 102 (i.e., the remote computing resources 108). For instance, the video capture device 102 may couple to the remote computing resources 108 over the network 112. As illustrated, and as set forth above, the remote computing resources 108 may be implemented as one or more servers 110(1), 110(2), . . . , 110(P) and may, in some instances, form a portion of a network-accessible computing platform implemented as a computing infrastructure of processors 126, storage (e.g., memory 128), software (e.g., modules 130), data access, and so forth that is maintained and accessible via the network 112, such as the Internet. The remote computing resources 108 may not require end-user knowledge of the physical location and configuration of the system that delivers the services. Common expressions associated for these remote computing resources 108 may include "on-demand computing", "software as a service (SaaS)", "platform computing", "network-accessible platform", "cloud services", "data centers", and so forth.

The servers 110(1)-(P) may include the processor 126 and the memory 128, which may include one or more modules 130 and which may store or otherwise have access to some or all of the components described with reference to the memory 118 of the video capture device 102. For instance, the memory 128 may have access to and utilize the modules 122 that perform video stitching and/or speech recognition operations. In some examples, the video capture device 102 may upload the video data 120 and/or the stitched video data 124 to the remote computing resources 108 for processing, given that the remote computing resources 108 may have a computational capacity that exceeds the computational capacity of the video capture device 102. Therefore, the video capture device 102 may utilize the functionality of the remote computing resources 108 for performing relatively complex analysis and processing the video data 120 captured from the cameras 114 and the motion sensor data 136 generated/detected by the motion sensor(s) 134 of the video capture device 102.

Alternatively, or in addition to the video capture device 102 stitching the video data 120 to generate the stitched video data 124, the video capture device 102 may transmit the raw video data 120 captured by the multiple cameras 114 to the remote computing resources 108. The remote computing resources 108 may then stitch together the video data to generate the stitched video data 124.

The video capture device 102, the user device 106, and/or the remote computing resources 108 may communicatively couple to the network 112 via wired technologies (e.g., wires, USB, fiber optic cable, etc.), wireless technologies (e.g., RF, cellular, satellite, Bluetooth, etc.), or other suitable connection technologies. The network 112 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other suitable connection technologies.

Regardless of whether the video stabilization adjustments to the video data 120 and video stitching occurs locally on the video capture device 102, or whether the video stabilization adjustments to the video data 120 and video stitching is performed remotely from the video capture device 102 (e.g., the video data 120 is sent to the remote computing resources 108 via the network 112 for stitching), the remote computing resources 108 may further process the stitched video data 124

Figure 2:
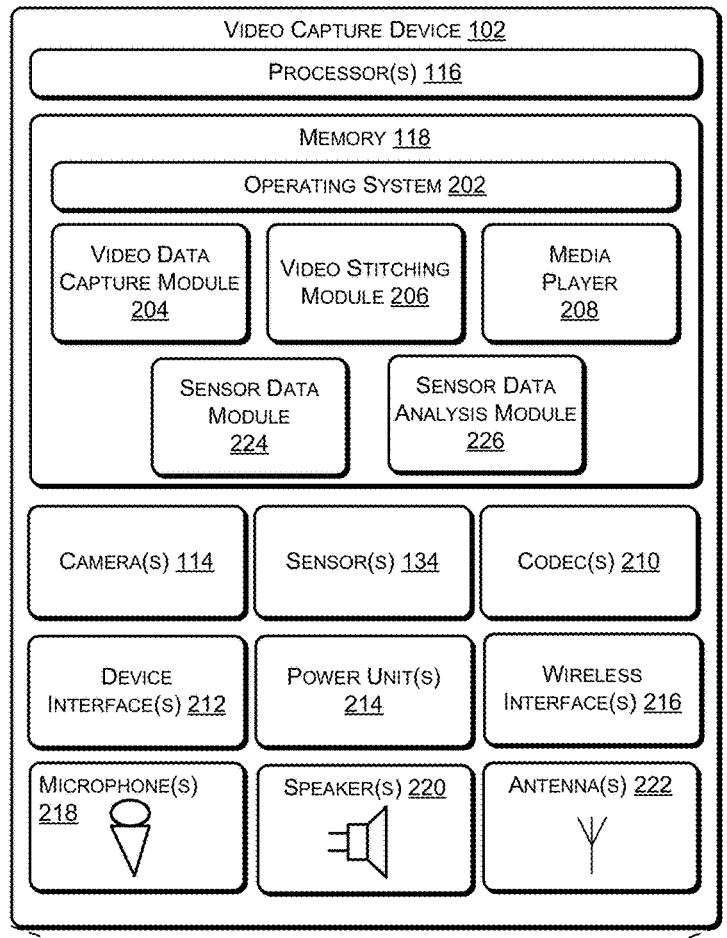
FIG. 2 illustrates an example device that includes multiple cameras configured to capture video data, stabilize the video data based on motion sensor data, and generate a panoramic video.

FIG. 2 shows selected functional components and/or modules of one implementation of the video capture device 102 in additional detail. Generally, the video capture device 102 may be implemented as a standalone device that may be relatively simple or complex in terms of functional capabilities with input/output components, memory, and processing capabilities. For instance, the video capture device 102 may or may not have a keyboard, keypad, or other form of mechanical input in some implementations. The video capture device 102 may or may not have a display or touch screen to facilitate visual presentation and user touch input. Moreover, the video capture device 102 may be implemented with the ability to receive and output audio, video, and/or visual data, a network interface (wireless or wire-based), power, and processing/memory capabilities. As set forth above with respect to FIG. 1, the video capture device 102 may include multiple cameras 114 that capture video data 120 that is used to generate panoramic video/images 132.

In the illustrated implementation, the video capture device 102 may include the processor(s) 116 and the memory 118. In various embodiments, the processor(s) 116 may execute one or more modules and/or processes to cause the video capture device 102 to perform a variety of functions, as set forth above and explained in further detail in the following disclosure. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. The processor 116 may include multiple processors 116 and/or a single processor 116 having multiple cores.

The memory 118 may include computer-readable storage media ("CRSM"), which may be any available physical media accessible by the processor(s) 116 to execute instructions stored on the memory 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 116. As will be discussed in additional detail, the memory 118 may include an operating system 202, one or more modules 122, such as a video capture module 204, a video stitching module 206, a media player 208, a sensor data module 224, and a sensor data analysis module 226.

In addition to the processor(s) 116 and the memory 118, the video capture device 102 may include multiple cameras 114. For instance, as described in additional detail below, the video capture device 102 may include four cameras 114 that are positioned on/within the video capture device 102 approximately 90° from one another. Each of the multiple cameras 114 may capture video data 120, such as a video stream, within its corresponding field of view 226. As a result, by the four cameras 114 simultaneously capturing video, the video capture device 102 may capture 360° of video surrounding the video capture device 102. For the purposes of this discussion, the cameras 114 may include any type of camera 114 (e.g., high definition (HD) camera) that is capable of capturing video and/or images (e.g., still images, panoramic images, etc.).

The video capture device 102 may also include one or more motion sensors 134, codecs 210, device interfaces 212, power units 214, wireless interfaces 216, microphones 218, speakers 220, and antennas 222. For instance, the motion sensors 134 may include a motion detector to determine/measure the motion and/or the velocity of motion (e.g., speed, rate, etc.) of the video capture device 102, a location sensor (e.g., GPS sensor) to determine the position/physical location of the video capture device 102, an accelerometer to determine the acceleration of movement of the video capture device 102, an inertial measurement unit (IMU) to determine the velocity and orientation of the video capture device, a gyroscope to determine or maintain the orientation of the video capture device 102, an altimeter/altitude meter to determine the altitude of the video capture device 102, a compass to determine the orientation/direction of the video capture device 102, a light sensor or light meter to help determine the proper exposure of the video capture device 102 based on ambient lighting conditions, and/or any other type of sensor 210 utilized to determine the motion, velocity, acceleration, orientation, tilt, environmental lighting, etc., of the video capture device 102. These motion sensors 134 may all contribute to the generation of the motion sensor data 136 that may be used by the video capture device 102 and/or the remote computing resources 108 to adjust the video data 120.

In addition, the video capture device 102 may include one or more codecs 210 that may be coupled to the microphone(s) 218 and/or the speaker(s) 220 to encode and/or decode audio signals generated by the microphone(s) 218. The codec(s) 210 may convert audio data and/or video data between different formats. In some instances, the codecs (210) are utilized by the encoder 138 to encode the video data 120 and provide motion compensation to result in a compressed file for sending to the remote computing resources 108.

One or more device interfaces 212 (e.g., USB, broadband connection, etc.) may further be provided as part of the video capture device 102 to facilitate a wired connection to a network, such as network 112, or a plug-in network device that communicates with other wireless networks. Moreover, one or more power units 214 may further be provided to distribute power to the various components of the video capture device 102. The power unit(s) 214 may include hardware that enables the video capture device 102 to be plugged into an outlet, thereby providing power to the video capture device 102. Alternatively, or in addition, the power unit(s) 214 may correspond to one or more batteries (rechargeable or not) that may provide power to the video capture device 102. Provided that the video capture device 102 includes one or more batteries, the video capture device 102 may be carried and used by the user 104 while he/she moves between different locations. Additionally, while this disclosure primarily discusses embodiments utilizing four cameras, it should be appreciated that some preferred embodiments can utilize more cameras, such as five, or six, or eight or more cameras.

In the illustrated example, the video capture device 102 may include one or more wireless interfaces 216 coupled to one or more antennas 222 to facilitate a wireless connection to a network (e.g., network 112). The wireless interface 216 may implement one or more of various wireless technologies, such as Wi-Fi, Bluetooth, radio frequency (RF), and so on.

The video capture device 102 may include a microphone unit that comprises one or more microphones 218 to receive audio input. The microphone(s) 218 of the video capture device 102 may detect audio (e.g. audio signals) from the environment 102, such as sounds uttered by the user 104 and/or other noise within the environment. For instance, the microphone(s) 218 of the video capture device 102 may detect audio commands uttered by the user 104, which may include audible instructions for the video capture device 102 to power on, begin recording video, stop recording video, and so on. The video capture device 102 may also include a speaker unit that includes one or more speakers 220 to output audio sounds. Such audio sounds may be responsive to the audio commands uttered by the user 104, or may provide various types of information to the user 104.

Therefore, the user 104 of the video capture device 102 may interact with the video capture device 102 by speaking to it, and the microphone(s) 218 may capture sound and generate an audio signal that includes the user speech. The codec(s) 210 may encode the user speech and transfer that audio data to other components. The video capture device 102 can communicate back to the user 104 by emitting audible statements through the speaker(s) 220. In this manner, the user 104 may interact with the video capture device 102 simply through speech, without use of a keyboard or display common to other types of devices.

However, the video capture device 102 may include other user interface (UI) components that enable user interaction with the video capture device 102. For instance, the video capture device 102 may include haptic input devices, such as navigation buttons, keypads, joysticks, keyboards, touch screens, and the like. Furthermore, the video capture device 102 may include a display for text, graphical, or other visual output. The video capture device 102 may also include non-input control mechanisms, such as basic volume control button(s) for increasing/decreasing volume, buttons to cause the cameras 114 of the video capture device 102 to start and stop recording video data 120, buttons to adjust parameters (e.g., resolution, zoom, etc.) associated with the cameras 114, as well as power and reset buttons. There may additionally be controls that cause the video capture device 102 to generate panoramic still images or panoramic video. There may also be one or more simple light elements (e.g., LEDs around perimeter of a top portion of the device 106) to indicate a state such as, for example, when power is on or to indicate that the video capture device 102 is currently capturing video of the surrounding environment. Though, in some instances, the video capture device 102 may not use or need to use any input devices or displays.

In various embodiments, the memory 118 of the video capture device 102 may include the operating system 202. In some instances, the operating system 202 may be configured to manage hardware and services (e.g., device interface(s) 212, wireless interface(s) 216, codec(s) 210, etc.) within, and coupled to, the video capture device 102 for the benefit of other modules. Moreover, the media player 208 may function to output any type of content on any type of output component of the video capture device 102. For instance, the media player 208 may output audio via the speaker(s) 220 and/or video or other visual information via a display of the video capture device 102. For instance, the user 104 may interact (e.g., audibly, via other user input, etc.) with the video capture device 102 to instruct the media player 208 to cause output of audio (e.g., audio of a video), and/or a video or an image captured by the cameras 114.

In addition, the memory 118 may include the video data capture module 204, the video stitching module 206, the sensor data module 224, and the sensor data analysis module 226. Also, some or all of the components, modules, hardware, etc., may reside additionally or alternatively at the remote computing resources 108. In various embodiments, the video data capture module 204 may cause the multiple cameras 114 of the video capture device 102 to capture video data 120 of the surrounding environment. That is, assume that the video capture device 102 includes four different cameras 114—a first camera 114, a second camera 114, a third camera 114, and a fourth camera 114. The video data capture module 204, may cause the first camera 114 to capture first video data 120, the second camera 114 to capture second video data 120, the third camera 114 to capture third video data 120, and the fourth camera 114 to capture fourth video data 120. As a result, the video capture device 102 may capture four, and possibly more, video streams simultaneously.

The sensor data module 224 may cause the motion sensor(s) 134 of the video capture device 102 to detect and/or generate the motion sensor data 136, which may include motion information corresponding to motion of the video capture device 102 during video capture. The information may include an indication of a time in which the motion occurred, such that it can be correlated to frames of video data 120. The information may further include a duration of the motion, a direction of the motion, a velocity of the motion, a magnitude of the motion, acceleration and/or deceleration of the motion, an angle of rotation, and/or a distance of the motion. The motion sensors 134 may be activated when the video capture device 102 begins capturing video data 120. Alternatively, the motion sensors 134 may remain active when the video capture device 102 has power, but only store motion sensor data 136 once the video capture device 102 begins capturing video data 120.

The sensor data analysis module 226 may take the motion information (e.g., the motion sensor data 136) and correlate the motion to each frame of video data 120. More specifically, the sensor data analysis module 226, using the motion information, may be able to calculate the pixel movement between subsequent frames of video data 120 as a result of unwanted movement of the video capture device 102. The sensor data analysis module 226, executing one or more algorithms, may compute stabilization adjustments that are to be applied to each frame of the video data 120, or even to each pixel within each frame, in order to adjust the video data 120, which may eliminate, minimize, or otherwise reduce the effects of unwanted movement of the video capture device 102 within the panoramic video 132.

Due to the multiple cameras 114 of the video capture device 102 being oriented symmetrically about the video capture device 102, such as, for example, four cameras being spaced approximately 90 degrees about the video capture device 102, the stabilization adjustments calculated for the video data 120 captured by one camera 114(1) may be applied to the video data 120 captured by an opposite camera 114(3). Because the motion of the video capture device 102 affects all the cameras 114, the motion estimation calculations for a single video stream may be applicable to other video streams captured by other cameras 114. The motion vectors calculated as part of the motion estimation calculation may be used to stabilize the video data 120 and/or provide motion compensation to the video data 120 during encoding of the video data 120.

Moreover, due to the multiple cameras 114 of the video capture device 102 having overlapping fields of view, the video stitching module 206 may stitch together the video data 120 captured by the cameras 114 to generate the stitched video data 124, where the stitched video data 124 corresponds to 360° video. In various embodiments, the video capture device 102 may transmit the raw video data 120 captured by the cameras 114 to the remote computing resources 108, which may then stitch the video data 120. However, the video stitching module 106 may reside on the video capture device 102 and may first stitch together the video data 120 and then transmit the stitched video data 124 to the remote computing resources 108 for additional processing.

The stabilization adjustments applied to the video data 120 captured by each camera 114 may make the stitching process more efficient. For example, the stabilization adjustments may have the effect of taking features, blocks, pixel values, or pixels that are contained in multiple sequential frames of video data 120 and positioning them at the same location within sequential frames of video data. The result is that the pixels within the frames of video data 120 will remain stationary from frame to frame once the video data 120 is adjusted/stabilized for camera 114 motion.

The video stitching module 206 may stitch the individual video streams such that video streams corresponding to a first camera 114 are stitched to video streams corresponding to the two cameras 114 that are adjacent to the first camera 114. Each video stream, or even each frame within the video stream, may have metadata that includes various types of information about the video stream/frame. For instance, the metadata may indicate the specific camera 114 that captured the video stream. In addition, each frame of the video stream may include a time stamp indicating a time in which the frame was captured. As a result, the video stitching module 206 may stitch together the appropriate video streams (e.g., video streams from cameras 114 adjacent to one another). The video stitching module 206 may also be able to stitch together the appropriate frames of the video streams to one another, such that frames having the same time stamps are stitched to one another.

For the purposes of this discussion, video stitching may correspond to the process of combining multiple video streams having overlapping fields of view to produce a single video stream. The video stitching module 206 may utilize various types of video stitching software and/or video stitching algorithms to stitch the video streams to one another. In various embodiments, the independent video streams may be of varying quality, color, lighting, contrast, etc., and may not require exact overlap in order to be stitched. Upon stitching the video streams to each other, any seams between the video streams of the stitched video (i.e., stitched video data 124) may be reduced, or may not be detectable, as discussed below.

The video stitching module 206 can be configured to compare the independent video streams in terms of exposure, color, lighting, contrast, etc., and can smoothly blend the independent video streams together to create an aesthetically pleasing video. In some instances, this is performed by analyzing pixels between frames in the independent video streams and applying a blending gradient transition algorithm to smoothly blend the pixel colors to reduce or eliminate artifacts that may exist at the video data boundary. In other instances, the video stitching module 206 may retrieve the exposure and color settings directly from the cameras 114 and use this information to smoothly blend the exposure between the individual video streams. This smoothing and blending at the boundary between individual video streams may be accomplished on the video capture device 102, and/or may be performed by the remote computing resources 108.

Additionally, the video data stitching module 206 may stitch the individual video streams and send the stitched video data 124 to the remote computing resources 108. The remote computing resources 108 may segment the stitched video data 124 into regions based upon factors other than which camera captured the video data 120. This allows the stitched video data 124 to be segmented into more regions than there are cameras 114. The regions can be analyzed for subjects that may be of interest to the user 104 and color adjustments, including exposure, brightness, contrast, etc., can be performed individually on the regions, and the regions can then be stitched, or blended, back together and the boundaries between regions smoothed and blended as described.

FIG. 2 further illustrates the video capture device 102 having four different cameras 114—a first camera 114(1), a second camera 114(2), a third camera 114(3), and a fourth camera 114(4). In various embodiments, the four cameras 114 are positioned on the video capture device 102 such that they are 90°, or approximately 90°, from one another. For instance, the first camera 114(1) and the third camera 114(3) may be associated with a first axis (and would therefore be coaxial) that is 90° from a second axis associated with the second camera 114(2) and the fourth camera 114(4) (which are likewise coaxial). In some instances, the first axis and the second axis are coplanar, resulting in all four cameras being coplanar. As a result, each of the four cameras 114 captures video in a different direction.

In addition, each of the four cameras 114 has a corresponding field of view 226. The field of view 226 for a particular camera 114 may correspond with the portion of the environment surrounding the video capture device 102 that is visible to that camera 114 when the camera 114 is positioned at a particular position and orientation. First objects within the field of view 226 of a camera 114 may be depicted within video data captured by that camera 114, while second objects outside of that field of view 226 will not be depicted in that video data, although such second objects may be included in the field of view 226 of a different camera 114 of the video capture device 102. Moreover, the field of view 226 of a camera 114 of the video capture device 102 may change in response to movement (e.g., vertical movement, horizontal movement, rotation, etc.) of the video capture device 102.

As shown in FIG. 2, each of the cameras 114 may have a corresponding field of view 226, such that the first camera 114 has a first field of view 226(1), the second camera 114(2) has a second field of view 226(2), the third camera 114(3) has a third field of view 226(3), and the fourth camera 114(4) has a fourth field of view 226(4). As shown, the field of views 226 of adjacent cameras 114 of the video capture device 102 may overlap. For instance, the field of view 226(1) of the first camera 114(1) overlaps with the second field of view 226(2) of the second camera, and overlaps with the fourth field of view 226(4) of the fourth camera 114(4).

Therefore, certain objects included in the first field of view 126(1) of the first camera 114(1) may also be included in the second field of view 126(2) of the second camera 114(2) or in the fourth field of view 126(4) of the fourth camera 114(4), and vice versa. As a result, the cameras 114 of the video capture device 102 are able to capture video in multiple different directions, which allows the stitched video data 124 to represent a 360° video of the environment surrounding the video capture device 102.

Figure 3:
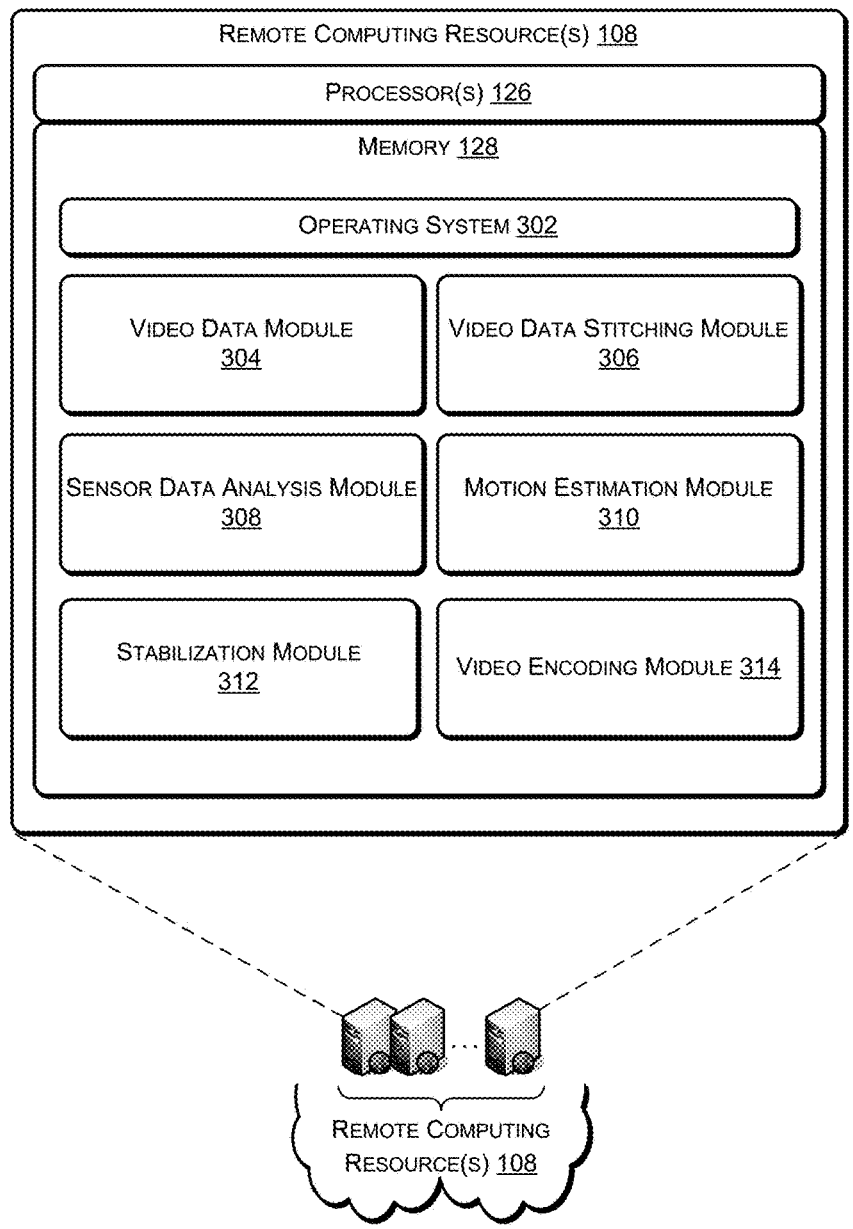
FIG. 3 illustrates an example device that is configured to analyze video data, use one or more stabilization algorithms to stabilize the video data, and generate a panoramic video based on video data captured by multiple cameras of a video capture device.

FIG. 3 shows selected functional components and/or modules of one implementation of the remote computing resources 108 in additional detail. As shown, the remote computing resources 108 may include processor(s) 126 and memory 128, which may include an operating system 302, a video data module 304, a video data stitching module 306, a sensor data analysis module 308, a motion estimation module 310, and a stabilization module 312. Moreover, the remote computing resources 108 may provide stabilization to the video data 120 and generate a panoramic video 132 from video data 120 captured by multiple cameras 114 of the video capture device 102.

In certain embodiments, the video data module 304 may receive video data 120 captured by the multiple cameras 114 of the video capture device 102. The video data module 304 may receive each of the raw video streams captured by each camera 114. In this scenario, the multiple cameras 114 of the video capture device 102 may capture frames of video, encode the frames of video, and then send, via the network 112, the encoded frames of video to the remote computing resources 108. Alternatively, the video data module 304 may receive the stitched video data 124 from the video capture device 102. That is, at least a portion of the stitching of the video data 120 may be performed by the video capture device 102. Moreover, the video data module 304 may receive motion sensor data 136 from the motion sensor(s) 134 of the video capture device 102, or may receive video data 120 that has already been adjusted by one or more of the video stabilization techniques described herein.

Provided that video capture device 102 provided the video streams to the remote computing resources 108, or only stitched a portion of the video streams, the video data stitching module 306 of the remote computing resources 108 may stitch together the video data 120 captured by the multiple cameras 114 of the video capture device 102 using the techniques described herein. For instance, the video data stitching module 306 may decode the encoded video streams transmitted by the video capture device 102 and stitch the frames together, thereby generating the stitched video data 124, which may represent 360° video. The remote computing resources 108 may then perform additional processing on the stitched video data 124.

Provided that the video capture device 102 provided the video streams to the remote computing resources 108 that have not been adjusted for stabilization, the sensor data analysis module 308 may receive the motion sensor data 136 and may correlate the motion sensor data 136 with one or more frames of video data 120 from a camera 114 of the video capture device 102. For instance, the sensor data analysis module 308 may use time stamp information associated with the motion sensor data 136 to correlate the video capture device 102 motion represented by the motion sensor data 136 with one or more frames of video data 120 from one camera 114 of the video capture device 102. In this way, there may be time stamp information associated with the motion sensor data 136 (e.g., motion time stamp information) and time stamp information associated with the frames of video data 120 (e.g., imaging time stamp information) that can be correlated to determine a motion of the video capture device 102 during the time that video data 120 was being captured.

The motion estimation module 310 may use the motion sensor data 136 to calculate the pixel shift between subsequent frames of video data 120 due to unwanted movement of the video capture device 102. That is, the motion estimation module 310, using the motion sensor data 136 representing the unwanted camera motion over a given time period, can calculate the distance that corresponding pixels have shifted within sequential frames of video data 120. For example, in a first frame of video data 120 from a first camera 114, a pixel may represent the corner of a building within a scene captured by the video capture device 102 while the video capture device 102 was being held by the user 104. During a given time frame, such as one second, there may be thirty frames of video data 120 that show the pixel representing the corner of the building.

Due to the video capture device 102 being held by the user 104, the resulting video data 120 exhibits the shaky or jerky motions of the camera 114 during this video clip, and the pixel representing the corner of the building moves significantly from frame to frame in the video clip. The motion estimation module 310, using the motion sensor data 136, can estimate or otherwise determine the amount of pixel movement from one frame of video data 120 to the next frame of video data 120 based on the movement of the video capture device 102. The motion estimation calculated by the motion estimation module 310 can be calculated for each successive frame of video data 120 for an entire video stream.

The stabilization module 312 can receive the motion estimation calculated by the motion estimation module 310 and can apply the information as stabilization adjustments to the video data 120. That is, based upon the motion estimation calculations from one frame to the next frame of video data 120, the stabilization module 312 can shift the pixels in a frame of video data 120 to counter act the effects of a shaky video capture device 102.

As has been discussed, a common characteristic with video cameras, whether they are hand held, or affixed to a moving base, such as a vehicle, a helmet, a harness, a clip, or some other attachment mechanism, is that the shaking, movement, jostling, etc., of the camera results in a noticeable amount of camera shake. The camera shake may result in a video that is not aesthetically pleasing as it is difficult for a viewer to focus on the subject of the video when it is shaking or moving about the viewing screen in a way that is unnatural to the expected movement of people and objects within the real world.

Moreover, many cameras, such as cameras that rely on a complementary metal-oxide semiconductor (CMOS) sensor for image capture, rely on a rolling shutter, in which each image row of the image sensor is exposed sequentially. Consequently, each row of image data is exposed at a slightly different time. Where the camera 114 is shaking or moving during video capture, the captured frames of video (and hence the video) may exhibit a visually noticeable oscillation. More specifically, objects that should appear straight, such as the edge of a tall building, may appear in a video clip to be wavy or wobbly as a result of a shaky camera that utilizes a rolling shutter. In cameras that rely on a charged coupled device (CCD) sensor, in which the entire sensor is exposed to the light reflected from a scene at once (rather than exposing the scene line by line as in a CMOS sensor), even though there may not be rolling shutter artifacts, camera shake still produces a noticeable shaking of the video and it may be desirable to minimize the effects of camera shake.

A number of digital stabilization techniques may be implemented with the systems and processes described herein to provide a more aesthetically pleasing video. Some of the suitable stabilization techniques rely on motion estimation, which is the process of computing motion vectors to coordinate the motion from one 2D image to another. This may be done by comparing one frame of video with a subsequent-in-time frame of video. The comparison may focus on specific portions of the frame to track how those portions move from frame to frame. In some instances, the specific parts of the frames that are tracked and compared are rectangular blocks of pixels, although it may be performed by identifying arbitrary shaped patches, or even on a pixel by pixel basis.

The computed motion vectors can be calculated based on a translational model that takes into account rotation and/or translation of the video capture device 102. While the motion vectors can be calculated based upon an analysis of sequential frames within a video stream to track movement of a pixel or a block of pixels between frames, relying on inertial motion sensor data can provide a much more efficient and accurate translational model.

Figure 4:
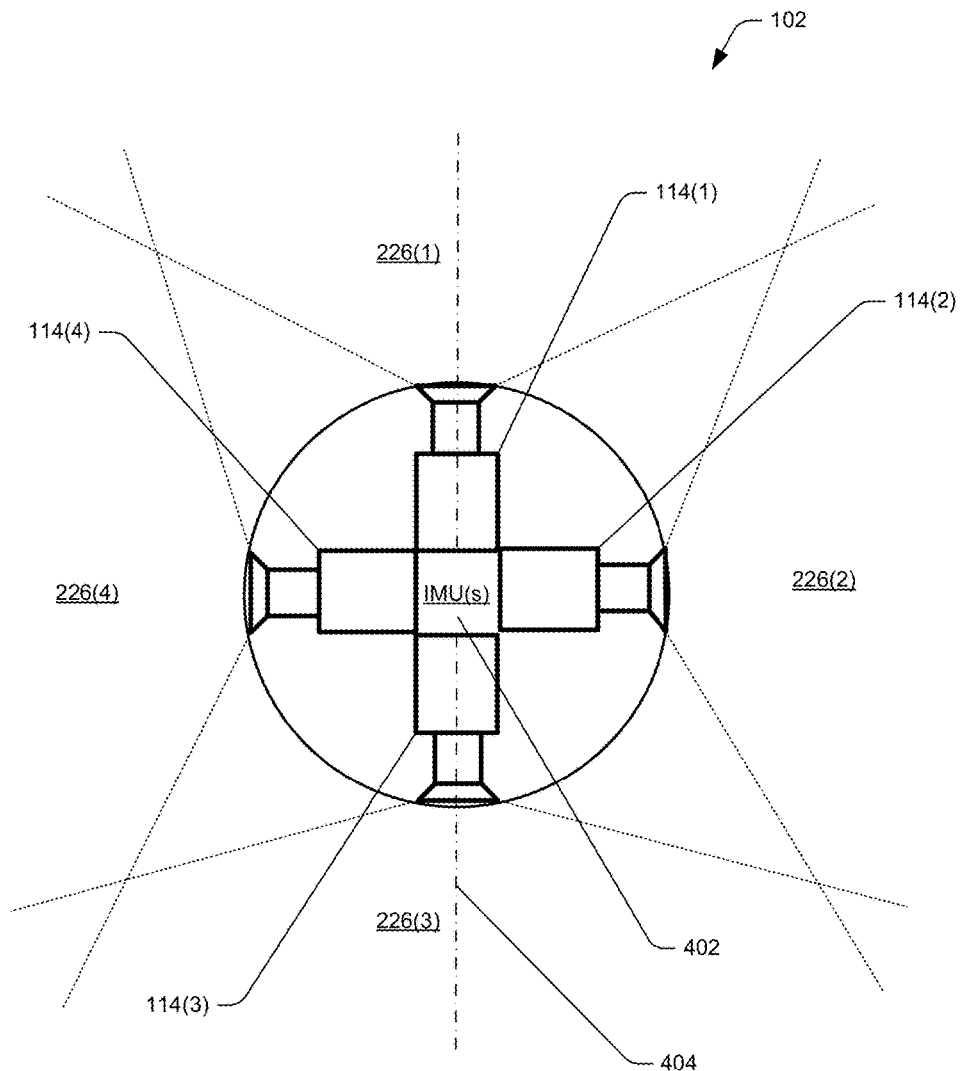
FIG. 4 illustrates an example video capture device that includes multiple cameras and motion sensors configured to capture video data and utilize motion sensor data to stabilize the video data in order to generate a panoramic video.

FIG. 4 illustrates one example of a video capture device 102 having four cameras 114 spaced equally around the video capture device 102. In the illustrated example, each camera 114 is spaced 90° from the adjacent camera 114. In the embodiments where the cameras 114 have an overlapping field of view 226, a 360° field of view is possible when the captured video streams are stitched together.

In the illustrated embodiment, the cameras are preferably coplanar, meaning that two opposing cameras 114(1) and 114(3) are positioned along a first common axis 404. Similarly, the remaining two opposing cameras 114(2) and 114(4) share a second common axis that is coplanar, and approximately perpendicular, with the first common axis.

The video capture device 102 may have one or more motion sensors 134, and in some instances, one or more of the motion sensors 134 are inertial measurement units (IMUs) 402 that detect, generate, and/or collect motion data (e.g., motion sensor data 136) associated with the video capture device 102. The IMUs 402 may be any suitable motion sensors and may include one or more of an accelerometer, gyroscope, compass, GPS, or other suitable sensor that provides information regarding the location, orientation, rotation, or translation of the video capture device 102, and of the multiple cameras 114 of the video capture device 102. Moreover, the motion sensor(s) 134 may be any other type of sensor configured to generate motion sensor data 136 that is associated with the video capture device 102.

Because the multiple cameras 114 may be in a fixed relationship to one another that is symmetrical about a vertical axis through the video capture device, motion associated with one camera 114 typically translates into a corresponding motion of the opposite camera 114. For example, where a first camera 114(1) rotates to the left, the third camera 114(3) also rotates to the left. Similarly, where the first camera 114(1) pivots upward, the third camera 114(3) pivots downward. This motion can be detected, measured, and used encode the resulting video data 120 and to adjust the resulting video frames in the captured video data to reduce the effects of camera shake.

Figure 5:
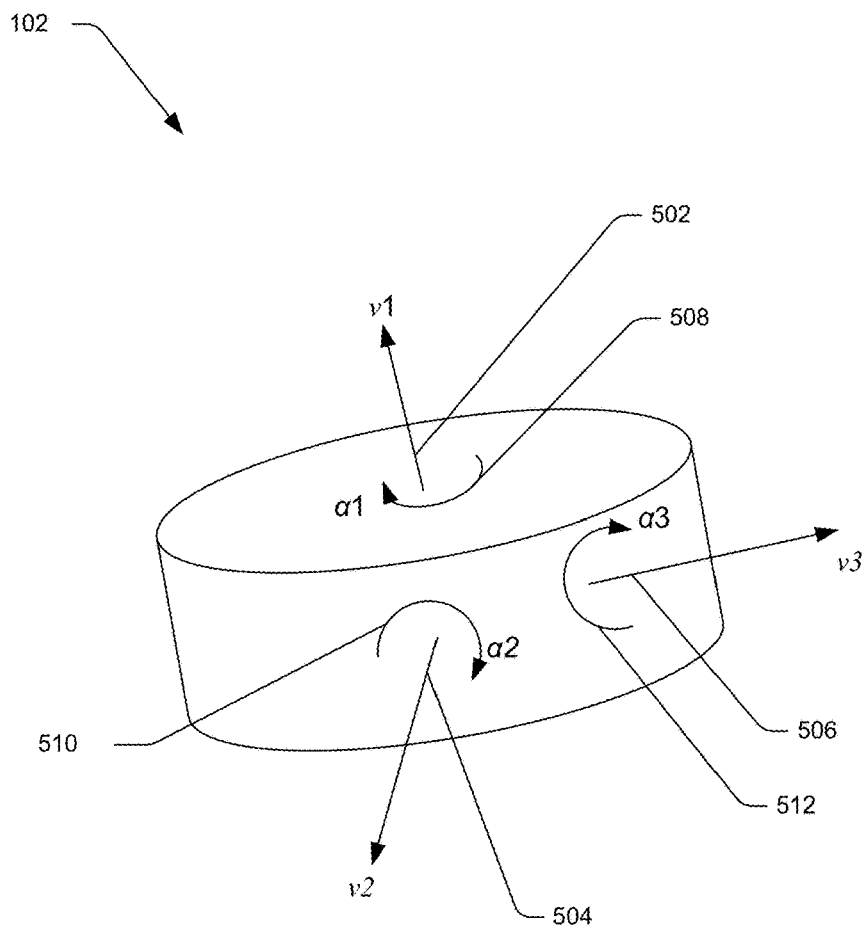
FIG. 5 illustrates an example video capture device that depicts translational and rotational motion associated with a video capture system.

FIG. 5 illustrates motion vectors that can act on a rigid body. For example, a video capture device 102 may be subject to six motion vectors, three of which are translational, and three of which are rotational. These motion vectors can be sensed, stored, and used in calculations performed by various algorithms. The sensed motion can be used to calculate motion vectors and used to estimate the resulting displacement of pixels from one frame of video data 120 to a subsequent frame of video data 120.

A video capture device 102 can be subject to translational movement in three directions, termed the x, y, and z directions. The translational movement can be represented by a vector that is defined by a direction and a velocity. For example, a video capture device may move in a horizontal direction at a certain speed, which can be represented by the vectors v1 502 and v2 504. These vectors can be calculated based upon the motion sensor data 136, such as the data that may be generated by an accelerometer. Similarly, motion in a vertical direction can be represented by the vector v3 506, which may include a direction and a speed.

Moreover, the video capture device 102 may also be subject to rotational motion, such as if the video capture device 102 tilts or pivots. The rotational motion of the video capture device 102 can be sensed, such as by a gyroscope, and the rotation motion data can be represented by vectors v1 502, v2 504, and v3 506 and/or angle rotations a1 508, a2 510, and a3 512. One or more gyroscopes can provide the rotational information with an acceptable level of accuracy while one or more accelerometers may be used to provide the translational motion. In one embodiment, a single gyroscope is implemented to provide the rotational motion information, and two or more accelerometers are used to provide the translational motion information, although any number of sensors (e.g., gyroscopes, accelerometers, etc.) may be used.

In order to estimate the displacement of pixels from one frame to the next frame in the video data 120 as a result of unwanted camera shake, the motion of each camera 114 may be calculated based on the information gathered from the motion sensors 134. Furthermore, the motion of each pixel within each video frame may also be estimated and/or otherwise calculated or determined.

For example, in sequential frames of the video data 120, a pixel value that represents an object present in both frames of video data 120 may have moved a certain distance from one frame to the next. This relocation of the pixel value from one frame to the next may be due to physical movement of the subject, or may be a result of movement of the video capture device 102 while the video data 120 is being captured. The motion estimation module 310 may track the displacement of the pixel value between sequential frames and note the distance of displacement. The motion estimation module 310 may also receive the output from the sensor data analysis module 308, which may indicate the motion vectors of the video capture device 102 during the time that the two sequential frames of video data 102 were captured.

The motion estimation module 310 may then calculate the expected movement of the pixel value from the first frame to the second frame based upon the video capture device 102 movement and it may then calculate a stabilization adjustment that can be used to adjust the pixel values within the second frame of video data 120 to account for the displacement due to camera shake.

Moreover, rather than track pixel value dislocation from one frame to the next, the motion estimation module 310 may simply rely on the motion sensor data 136 to calculate a stabilization adjustment without ever analyzing the frames of video data 120.

Motion estimation may be performed through any of a number of suitable methods. Various motion estimation methods rely on either direct processes or indirect processes. The direct processes may rely on pixel tracking and may include phase correlation algorithms, pixel recursive algorithms, or block matching algorithms. These methods rely on identifying one or more pixels that represent objects that are contained within sequential frames of video data. These pixels are tracked from frame to frame and the dislocation of the pixels is used to estimate motion from one frame to the next frame of video data 102. The indirect processes may rely on features found within the images, such as corner detection, and work by matching the features as they exhibit between time-subsequent frames. Any suitable process is appropriate and may be implemented within embodiments described herein. Of course, more than one process may be implemented in certain embodiments, and may depend on the configuration of the video capture device 102. The stabilization computations used to generate stabilization adjustments to frames of video data 120 may be performed by the video capture device 102, or may be performed by the remote computing resources 108. Moreover, the computational duties may be shared between processing resources.

Figure 6A:
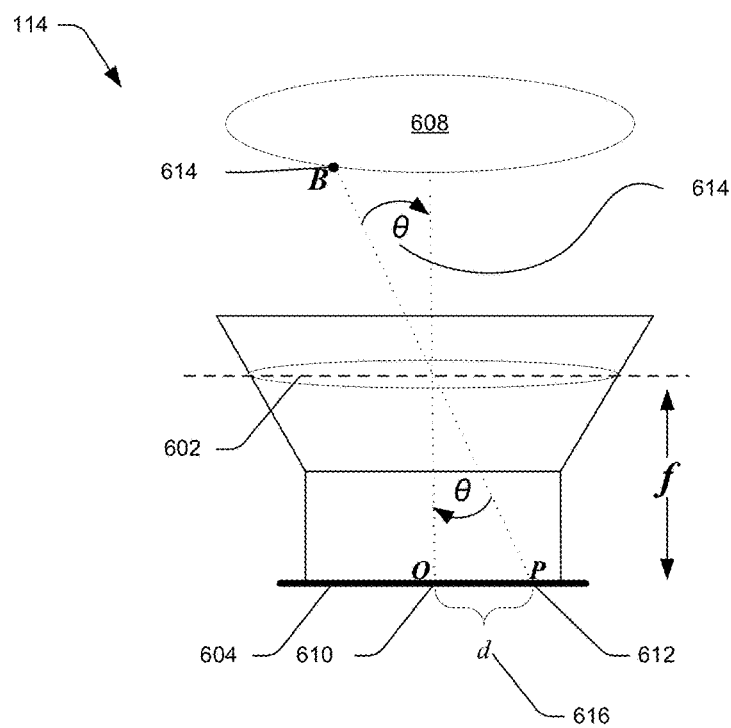
FIGS. 6a and 6b illustrate example diagrams illustrating how rotational motion of a video capture device results in translational motion on an image sensor of the video capture device.
Figure 6B:
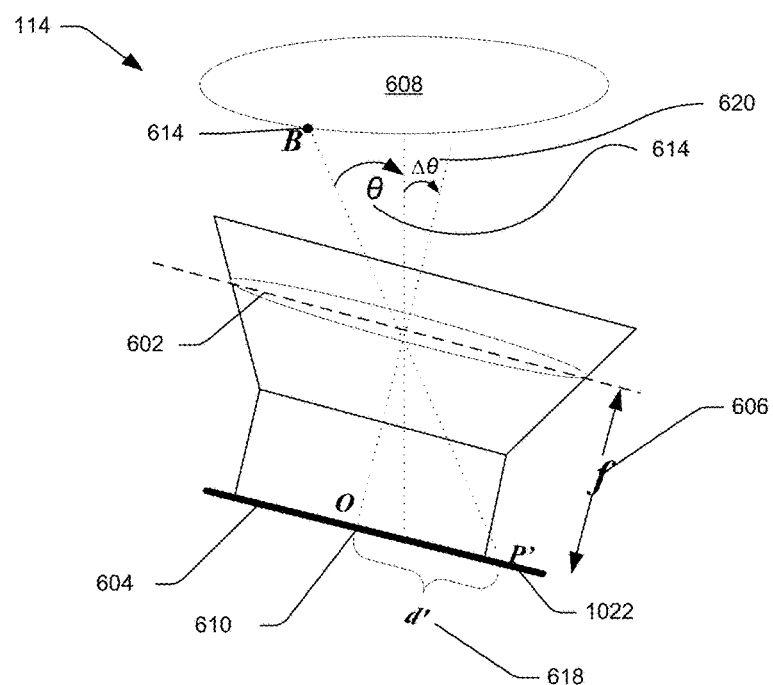

FIG. 6a and FIG. 6b illustrate an embodiment for calculating global motion vectors resulting from rotation of the video capture device 102. A global motion vector may be the result of multiplying the focal distance f 606 by the angle of rotation θ 614. The angle of rotation θ 614 is an angular measure of the rotation of a camera 114 of the video capture device 102 due to tilting, pivoting, or shaking the video capture device. More specifically, according to FIG. 6a, a camera lens 602 and an imager 604, such as a camera's imaging sensor, are generally parallel to one another and spaced a distance apart—the focal length f 606. The focal length f 606 may either be fixed or variable, and may already be known or may be included as part of the metadata associated with a video stream. As used herein, the terms imaging sensor and imager may be used interchangeably throughout.

As a camera 114 is pointed at a subject 608 (e.g., an object, a scene, a person, etc.), light reflected off the subject impinges upon the imaging sensor 604. The imaging sensor 604 saves this light data as colored pixels within the digital image. As the camera 114 is aimed directly at the subject, such as is illustrated in FIG. 10a, the center of the subject is captured at the center of the imaging sensor, at point O 610. A point on the subject 608 spaced away from the center, such as at point B 614, is captured on the imaging sensor 604, at point P 612. An angle θ 614 is created by drawing a line from point B on the subject to the lens 602 and from the center of the subject to the lens 602. This angle θ 614 is determined by the distance between the points on the subject, and their relative distance to the lens 602. This angle θ 614 creates a vertically opposite angle within the camera 114 between the lens 602 and the center of the imager O 610 and a point P 612 on the imager that exposes for the point B 614 on the subject. The distance between points O 610 and P 612 on the camera's imaging sensor are spaced by a distance d 616 that is dependent on the focal length f 606 of the camera.

As the camera rotates through an angle Δθ 620, such as shown in FIG. 10b, the points of the center of the subject and the point B 614 on the subject, are now both captured at different locations on the imaging sensor 604. As is illustrated in FIG. 10b, the subject point B 614 is now reflected on the imaging sensor 604 at point P' 622. Thus, point P 612 has shifted on the imaging sensor to P' 622, which is further away from the center of the imaging sensor O 610 as compared to FIG. 10a and is spaced from the center of the imaging sensor O 610 by a distance d' 618. The distance of shift, or Δd, is equal to d'−d and can be calculated by geometric equations that are based upon the focal length and the camera's angle of tilt.

Using the motion sensor data 136 to precisely determine the angle of camera rotation Δθ, the systems and processes described herein are able to calculate the pixel shift on the imaging sensor 604. For example, a motion sensor 134 may be a gyroscope which can accurately detect the rotation of the video capture device 102 over a time period. The detected rotation over a time period can be correlated with frames of video data 120 that were captured during the period of rotation. The motion estimation module 310 is able to calculate the pixel shift as a result of the rotation of the video capture device 102, and further calculate a stabilization adjustment to shift the pixels to effectively remove the effects of the unwanted video capture device 102 rotation.

Without this rotational data from the motion sensor(s) 134, it may still be possible to calculate the camera 114 rotation by analyzing sequential frames of video data 120 to extrapolate the camera 114 rotation. However, one benefit of relying on an inertial motion sensor, such as a gyroscope, for example, to provide this information is that the motion estimation calculation is much more direct, precise, and efficient. For example, while a computing device could analyze frames of video data, track pixel dislocation, extrapolate the likely camera 114 rotation, and then calculate a stabilizing adjustment based on the extrapolated camera rotation information, it is much more efficient to measure the camera 114 rotation during a time period of video data 120 capture, which avoids complicated and time consuming calculations that rely on assumptions and imprecise estimations.

Another exemplary process of calculating global motion vectors is by using the intrinsic camera parameters for a camera 114 of the video capture device 102. In digital photography or videography, a 3-dimensional point position in World coordinates is often represented as a 2-dimensional point position in Pixel coordinates. A projective mapping from a World coordinate system to a Pixel coordinate system is typically represented as a camera matrix. For example, the intrinsic parameters of a camera include focal length, image sensor format, and principal point. When represented as a matrix, the pixel coordinate system mapping (A) may take the form:

$$A = \begin{bmatrix} \alpha_x & \gamma & u_0 \\ 0 & \alpha_y & v_0 \\ 0 & 0 & 1 \end{bmatrix}$$

where $\alpha_x = f \times m_x$ and $\alpha_y = f \times m_y$, which represent the focal length in terms of pixels, where $m_x$ and $m_y$ are the scale factors relating to pixel distance. The variable γ represents the skew coefficient between the x and the y axis in the pixel coordinate system. The terms $u_0$ and $v_0$ represent the principal point, which is ideally the center of the image. Using the intrinsic camera parameters, if we denote $R_{Ci}(t)$ as the rotation for camera $C_i$ at a particular time, and $A_i$ as the intrinsic parameter matrix for camera $C_i$, we can calculate a global motion vector GM as $GMR(C_i, A_i, t) = (GMR_x(C_i, A_i, t), GMR_y(C_i, A_i, t))$, where $GMR_x$ and $GMR_y$ are projections on the imager plane coordinate axis. In other words, objects in the real world are projected and represented as a series of pixels arranged in rows and columns onto an imager, such as an image sensor of a camera. As an example, a global vector formula could take the form of: $GMR(C_i, A_i,$ $t) = (f_i * \nabla \theta_x, f_i * \nabla \theta_y)$ where $f_i$ is the focal length for camera $C_i$, and $\nabla \theta_x$ and $\nabla \theta_y$ represent an axial rotation in the x and y directions, respectively.

In order to accommodate translational movement of the video capture device 102, a translation projection can be made to the camera imager plane. If the translation in the camera coordinate system is $(v_x, v_y, v_z)$, and plane $(v_x, v_y)$ is the imager plane, then the global motion GM for camera $C_i$ can be represented by GM $(C_i, t) = (GMR_x(C_i, A_i, t), GMR_y(C_i, A, t)) + (v_x, v_y)$.

The above calculations may be performed for each video frame contained within the video data 120. In fact, these calculations may be performed for each block or even each pixel contained within each frame of the captured video data 120. The sheer number of calculations results in a computationally intensive process. Moreover, when factoring in the multiple video streams and the stitching that is used to generate panoramic videos, the process presents some unique computational challenges.

However, the process is greatly simplified by the realization that in some embodiments, the video capture device 102 is symmetrical in that the multiple cameras 114 are spaced an equidistance around the video capture device 102. That is, there may be an even number of cameras 114, and pairs of the cameras 114 may be positioned diametrically opposed from one another. In this way, once the motion estimation calculations are performed on the video data 120 captured by one camera 114, the results can be applied to the video data 120 captured by the opposing camera 114 without having to execute the algorithms separately on the opposing camera video data 120.

Figure 8:
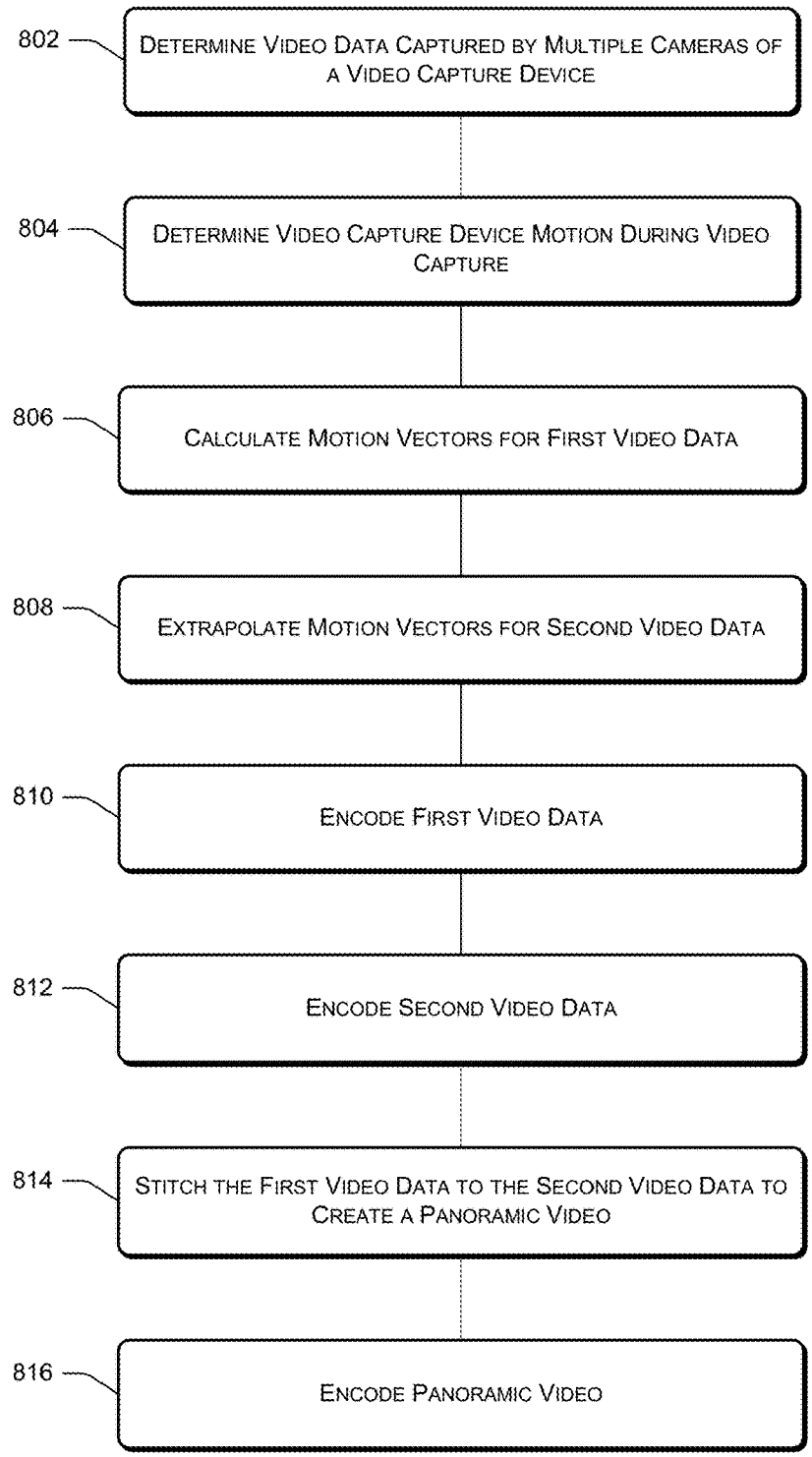
FIG. 8 is a diagram illustrating an example process of calculating motion vectors and encoding multiple video streams captured by multiple cameras of a video capture device.

For example, opposing cameras 114(1) and 114(3) of FIG. 8, share a common axis 404, and these cameras 114 point in opposite directions. More particularly, their image sensors are substantially parallel to one another although oriented in opposite directions. As the video capture device 102 rotates about a vertical axis, thus resulting in horizontal in-plane motion of the cameras 114, that is, simple rotation about a vertical axis such that the cameras 114(1) and 114(3) have negligible vertical components of movement, the motion vectors calculated for the video data 120 captured by the first camera 114(1) will be the same, or approximately the same, and directly applicable to the video data 120 captured by the third camera 114(3). For a motion in which there is a vertical component, such that the first camera rotates upwardly, the vertical component of the third camera 114(3) is the opposite of the first camera 114(1). For example, when the first camera 114(1) moves upwardly, the third camera 114(3) moves downwardly. This can be represented by a motion vector in which the motion vector of camera 114(3) is related to the motion vector of camera 114(1) by the following relationship: GM $(C_3, t) = (GMR_x(C_1, A_1, t), -GMR_y(C_1, A, t)) + (-v_x, v_y)$. The same is true for the second and fourth camera pair (e.g., cameras 114(2) and 114(4)), in that GM $(C_4, t) = (GMR_x(C_2, A_2, t), -GMR_y(C_2, A, t)) + (-v_x, v_y)$.

Considering the translation motion in addition to the rotation motion of the video capture device 102, the translation vector can simply be added to the rotation vector, such as: GM $(C_3, t) = (GMR_x(C_1, A_1, t), -GMR_y(C_1, A_1, t)) + (-v_x, v_y)$ and GM $(C_4, t) = (GMR_x(C_2, A_2, t), -GMR_y(C_2, A_2, t)) + (-v_x, v_y)$.

Zooming motion, that is, translational motion in which one camera 114 is moving toward a subject within its field of view 226, will result in the opposite camera moving away from another subject in its corresponding field of view 226. That is, as the first camera 114(1) is moving closer to a first subject by a distance, the third camera 114(3) may move away from a second subject by that same distance. Thus, in the motion vector calculation, a zooming motion simply reverses the sign of the translational component in that direction for the opposite camera 114. Assuming that the camera 114 is moving horizontally, the equations become:

$$GMZ(C_3, t, x, y) = (-1) * GMZ(C_1, t, x, y); \text{ and}$$

$$GMZ(C_4, t, x, y) = (-1) * GMZ(C_2, t, x, y).$$

Using an IMU to measure camera motion allows digital video stabilization with a high level of precision and efficiency. Moreover, when using motion sensor data, ambient lighting conditions become irrelevant, unlike a process that relies on video data analysis to estimate motion, which becomes increasingly difficult in low lighting conditions where contrast is relatively low. Additionally, significant foreground movement becomes moot since it is easily determined that the movement is actual movement of the subject and not as a result of camera shake.

Figure 7:
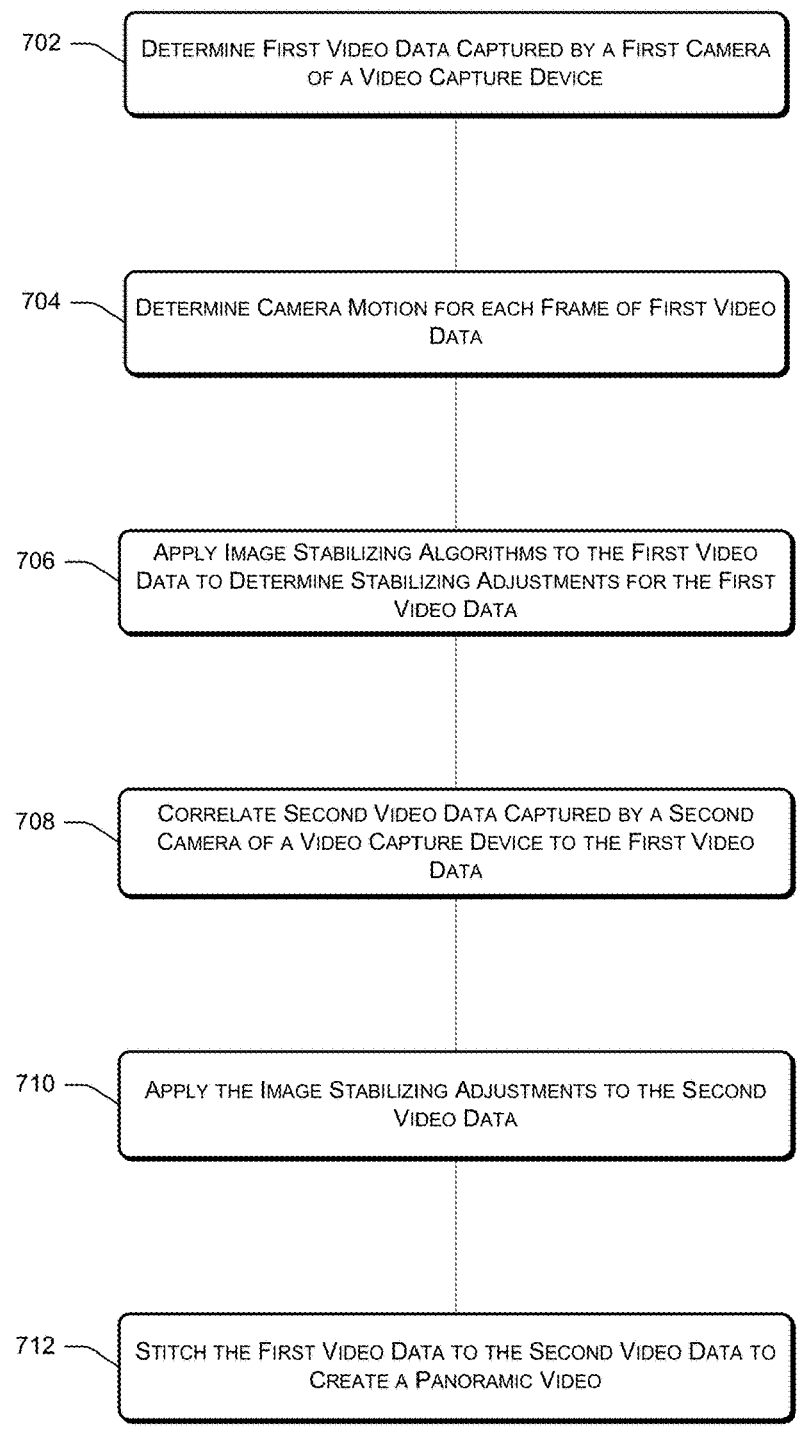
FIG. 7 is a flow diagram illustrating an example process of applying video stabilizing algorithms to multiple video streams captured by multiple cameras of a video capture device.

FIG. 7 is a diagram of an illustrative process for providing a stabilized panoramic video by determining camera motion, calculating stabilizing algorithms for one video stream, and applying stabilizing adjustments to multiple streams of video data. The processes of FIGS. 7 and 8 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, some of the operations can be repeated during the process.

More particularly, FIG. 7 is a diagram illustrating an example process 700 of applying image stabilizing algorithms to multiple video streams of a video capture device. At block 702, the system determines first video data 120 that is captured by a first camera 114 of a video capture device 102 having multiple cameras 114. As described elsewhere herein, the video capture device 102 may have cameras 114 that are opposed to one another, that is, they are pointed in opposite directions. However, some video capture devices 102 may have three, four, five, or six, or eight, or ten cameras evenly spaced around the video capture device 102.

Block 704 illustrates determining camera motion for each frame of the first video data. This may be accomplished through numerous ways. One way to determine camera motion is to analyze the captured video data 120 and track features or pixels between sequential frames within the video data 120 to estimate the camera motion from frame to frame. Another suitable way to determine the camera motion is by utilizing motion sensor data that is correlated with the video data 120. For example, the frames of video data 120 may include a time stamp that can be associated with similarly time stamped data relating to camera movement during video capture. In this way, by comparing time stamps, each frame of video data 120 can be correlated with the exact motion the camera 114 was experiencing while capturing the video data 120. Suitable motion sensors 134 include inertial motion sensors, such as a gyroscope, an accelerometer, a global positioning system, a compass, or other such motion sensor. In some embodiments, a microelectromechanical (MEMS) gyroscope is used to sense the video capture device's 102 motion during video capture.

At block 706, video stabilizing algorithms are executed or otherwise applied or run on the first video data. The video stabilizing algorithms preferably use the motion data, whether the motion data was extrapolated from the video data 120 after it was captured, or whether the motion data is motion sensor data 136 generated by one or more motion sensors 134 located within the video capture device 102, to determine stabilizing adjustments for each frame of video data 120 to reduce unwanted camera shake.

The video stabilizing algorithms may be stored in the memory of the video capture device 102 and executed on the video data 120 while it is stored in the memory 118 of the video capture device 102. Alternatively, the video stabilizing algorithms may be stored in the memory 128 of the remote computer resources 108 and executed on the video data 120 after the video data 120 has been transferred to the remote computing resources 108. In many cases, the remote computing resources 108 will have more computational resources and will likely be able to perform the video stabilizing more efficiently than the video capture device 102.

At block 708, the system correlates second video data captured by a second camera with the first video data captured by the first camera. In some implementations, this may be done by including a time stamp within metadata of each frame of video data 120, or among some, but not all, frames of video data 120. The frames may also be sequentially numbered in order to facilitate coordination of video data frames captured by different cameras 114.

The frame coordination advantageously allows the system to identify frames that were all captured at the same time by different cameras 114. This coordination allows much more efficient video stream stitching and applying the stabilization adjustments to the video data 120.

At block 710, once the stabilizing adjustments are calculated for the first video data, the video stabilizing algorithms can be applied to the second video data. In this way, the video stabilizing algorithms may only have to be executed once, since the camera motion can be associated to each video stream that was simultaneously captured by the multiple cameras 114 of the video capture device 102. With a video stabilization process, estimating motion in order to stabilize the video data 120 results in the most processer intensive calculations. By executing these calculations once and applying the results to another stream of video data 120 captured by a different camera 114, the systems described herein may significantly reduce the time and resources needed to process the video data to compensate for camera shake, when compared with a system that attempts to execute the video stabilization algorithms separately for each independent video stream.

At block 712, the first video data is stitched to the second video data, as described herein, to create a panoramic video. Additional algorithms, such as blending or smoothing, color correction, or creating panoramic images can additionally be executed on the video data.

While the foregoing description of video stabilization relies on calculating the stabilizing adjustments from a video stream captured by one camera 114 in order to apply corresponding adjustments to a video stream captured by an opposing camera 114, it is also possible to calculate the stabilizing adjustments from a video stream captured by one camera 114 and then extrapolate the stabilizing adjustments for a video stream captured by an orthogonal camera 114. That is, the calculated stabilization adjustments from the video data 120 captured by a first camera 114 can be used to extrapolate and create the stabilizing adjustments for video data 120 captured by a second camera 114 that is positioned 90 degrees with respect to the first camera 114. Additional motion sensor data 136 may be used to extrapolate and create the stabilizing adjustments for the video data 120 captured by the second camera 114.

In the example in which the video capture device 102 has four cameras 114 distributed equally around the video capture device 102, it may be possible to execute or run the video stabilization algorithms on the video data 120 captured by one camera 114 and, using additional information captured from the IMUs, extrapolate the necessary adjustments for the video data 120 captured by the remaining three cameras 114. Alternatively, rather than extrapolating all the necessary adjustments for the remaining three cameras 114, the system could extrapolate certain motion vector information from the video data 120 from a first camera 114 and then conduct a brief analysis of the video data 120 from one or more of the orthogonal cameras 114 to complete the motion vector calculations.

However, in some embodiments, the video stabilization algorithms may be executed on video data 120 captured by one camera 114 and then applied to an opposite camera 114. The video stabilization algorithms may then be run on video data 120 captured by an orthogonal camera 114 and applied to an opposite camera 114. Thus, for a video capture device 102 utilizing four cameras 114, the video stabilization algorithms may be run on video data 120 captured by two orthogonally positioned cameras 114 and then the calculated stabilizing adjustments can be applied to the two opposing cameras 114.

As the video data is captured, the frames of video data 120 may have metadata associated with them, such as, for example, information regarding which camera 114 captured the frames of video data 120, a time stamp, a frame number, camera capture settings, and any of the information captured by the IMUs before or during capture of the video data 120. This metadata may help to expedite the video stabilization process since the frames of one video stream can be analyzed for stabilization adjustment, and then correlated with frames of another video stream for application of the calculated stabilization adjustments.

One of the benefits of applying motion stabilization algorithms to the video data 120, aside from resulting in more pleasing video that minimizes the jerkiness or shakiness inherent with video taken from moving platforms, is that stitching the video streams becomes much more efficient. For example, as a result of the video stabilization algorithms, the pixels become more stationary within each frame and it requires less computational analysis to align pixels between video streams in order to stitch the streams together.

In some instances, only rotational motion is considered in the motion estimation models since the major contributor to camera shake is predominantly rotational motion. In this instance, translational motion is ignored, minimized, or otherwise weighted much less important than the rotational component in the motion estimation models. As used herein, rotation motion and tilt motion, or camera 114 tilt, are used interchangeably.

Whether the video stabilization algorithms are performed as a result of IMU data utilization, or as a result of pixel or feature analysis, having the ability of running the algorithms on the video data 120 captured by one camera 114 and then applying the same, or similar, adjustments to video data 120 captured by an opposing camera 114 results in a very efficient method for stabilizing video data 120 captured by multiple cameras 114. The result is a much higher quality panoramic video that requires fewer computational resources, allows a longer battery life, results in a smaller form factor, and finally, provides a higher quality panoramic video than a system that analyzes and stabilizes each video stream independently.

FIG. 8 is a diagram of an illustrative process for estimating motion and encoding video data by determining camera motion, calculating motion vectors for one video stream, and applying the motion compensation algorithms to multiple streams of video data.

At block 802, the system determines video data that is captured by multiple cameras 114 of a video capture device 102. At block 804, the motion of the video capture device 102 is determined during the time in which the video data 120 was captured. The motion can be determined by utilizing the motion sensor data 136 generated by the motion sensors 134, or can be determined based upon an analysis of subsequent frames of video data 120.

There are several methods that are suitable for determining the motion of the video capture device 102. Some such methods include block matching algorithms, in which a block of pixels is tracked from one frame to the next frame to determine the motion of the video capture device 102. Other methods include phase correlation, pixel recursive, and/or optical flow algorithms.

At block 806, in conjunction with determining the motion of the video capture device 102, motion vectors are calculated, which correlate with the movement of pixels from one frame of video data 120 to a subsequent frame of video data 120 based upon movement of the video capture device 102 during video capture. This can be done through any suitable algorithm, such as the ones listed above, or can be determined from the motion sensor data 136 generated by the motion sensors 134. Using the motion sensor data 136 may result in a more accurate, and a more efficient way, of calculating the motion vectors since the motion sensor data 136 natively describes the motion of the video capture device 102, as opposed to estimating and extrapolating based upon pixel movement between frames of video data 120.

At block 808, the motion vectors calculated for video data 120 captured by one camera 114 of the video capture device 102 can be utilized to determine the motion vectors for another camera 114 of the video capture device 102. As described above, since the cameras 114 of the video capture device 102 are in a fixed relationship with one another, movement of one camera 114 necessarily results in movement of another camera 114 of the video capture device 102. Accordingly, motion vectors that are calculated for one stream of video data 120 can be applied to another stream of video data 120 captured by another camera 114 of the video capture device 102. For example, cameras 114 that are positioned opposite one another on the video capture device 102 will have very similar motion vectors, with the exception of the motion vector associated with tilting the video capture device 102 upward, which results in an opposite movement between the opposing cameras 114 of the video capture device 102.

At block 810, the first video data 120 captured by the first camera 114 of the video capture device 102 is encoded. The encoding process generally involves running one or more motion compensation algorithms to compress the information contained in the encoded video file. This process takes advantage of the fact that, for many frames of captured video data 120, the primary differences between the frames are due to video capture device 102 movement. The result is that much of the information that represents one frame will be the same as the information in the subsequent frame.

Through the application of motion compensation algorithms, the encoded video stream will include some full reference frames that include all the information required to display the frame, and then the information for the intervening frames will only include the information needed to transform from one frame to the subsequent frame. This process allows encoded video files to have a much smaller file size, which increases efficiency in sending, storing, decoding, and displaying the video files.

Any of a number of suitable motion compensation algorithms may be used to encode the video data 120. For example, one such motion compensation algorithm is a block motion compensation algorithm. In this method, each frame of video data 120 is divided into blocks of pixels, which are tracked from one frame to the next frame to determine the motion vectors. This can be done at the pixel level, or even at a sub-pixel level by estimating the motion down to a fraction of a pixel. Other suitable algorithms include, but are not limited to, variable block size compensation algorithms, overlapped block motion algorithms, half-pixel and quarter-pixel compensation algorithms, among others.

The location of blocks of pixels, individual pixels, or sub-pixels, can be tracked from one frame to a subsequent frame and the pixel movement due to movement of the camera 114 can be determined. Using the motion vectors, the pixels in the subsequent frame of video data are shifted to remove the unwanted movement due to movement of the camera 114. The pixel values are compared between a reference frame and a subsequent frame of video data 120, and if the pixel movement is greater than a predetermined amount, which in some cases is greater than zero, the information regarding the pixel movement is stored. The result is that the change in pixel value location from one frame to a subsequent frame of video data 120 primarily due to subject movement is isolated and stored by the encoder 138, and pixel movement due to movement of the camera 114 is reduced or eliminated.

At block 812, the motion compensation algorithms executed for the first video data can be applied to encode the second video data without re-executing the motion compensation algorithms a subsequent time. This is possible, at least in part, by the fixed spatial relationship of the multiple cameras 114 about the video capture device 102.

At block 814, the first video data 120 is stitched with the second video data 120, which may be performed at the video capture device 102, at the remote computing resources 108, or a combination of both.

Optionally at block 816, the panoramic video is encoded into any of a number of available video file formats suitable for playback on any suitable viewing device. In some instances, the panoramic video is encoded for playback on a mobile device, such as a smartphone, and may optionally be encoded into a different format for playback on a television, virtual reality goggles, a panoramic projector, and other such suitable display devices.

Of course, the steps may be repeated for those instances in which a video capture device 102 has more cameras 114 than what was described in relation to FIG. 8. For example, where a video capture device has six cameras 114 positioned equally around the video capture device, the motion vectors may be calculated for the video data 120 captured by one camera 114, and then the motion vectors for the remaining five cameras 114 may be extrapolated based upon the motion vectors already calculated. Alternatively, motion vectors for three adjacent cameras 114 may be calculated, and the resulting motion vectors may be applied to the remaining cameras 114, such as by associating the motion vectors with a camera 114 that is directly opposite to that of a camera 114 for which the motion vectors were calculated.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   memory;
   at least one processor;
   a gyroscope;
   a plurality of video cameras including at least a first video camera and a second video camera; and
   one or more computer-executable instructions stored in the memory and executable by the one or more processors to perform operations comprising:
      receiving first video data captured by the first video camera and second video data captured by the second video camera;
      receiving, from the gyroscope, motion data indicating that the first video camera has moved from a first position to a second position;
      determining, based at least in part on the motion data, at least one motion vector that represents a direction and a magnitude of movement of the first video camera from the first position to the second position;
      determining, using a motion compensation algorithm and based at least in part on the at least one motion vector, a first difference between a first frame of the first video data and a second frame of the first video data, the first difference between the first frame of the first video data and the second frame of the first video data being determined by:
         shifting a first pixel value occurring in the second frame of the first video data a distance corresponding to the at least one motion vector;
         comparing a first location of a first pixel value occurring in the first frame of the first video data with a second location of the first pixel value occurring in the second frame of the first video data to determine a first motion of the first pixel value from the first frame of the first video data to the second frame of the first video data; and
         storing information regarding the first location of the first pixel value as a result of the first motion of the first pixel location from the first frame of the first video data to the second frame of the first video data being greater than a predetermined amount;
      determining, using the motion compensation algorithm and based at least in part on the at least one motion vector, a second difference between a first frame of the second video data and a second frame of the second video data.

2. The system as recited in claim 1, wherein the operations further comprise calculating the at least one motion vector associated with the first video camera during a time in which the first video camera was capturing first video data, wherein calculating the at least one motion vector indicates the direction and the magnitude of the motion of the first camera as the first camera moved from the first position to the second position.

3. The system as recited in claim 2, wherein individual frames of the first video data include a plurality of pixel values, and wherein the operations further comprise:
   calculating, using the at least one motion vector, an expected shifting of the plurality of pixel values between sequential frames of the individual frames as a result of the first camera moving from the first position to the second position;
   moving the plurality of pixel values within the sequential frames an amount to compensate for the expected shifting of the plurality of pixel values;
   determining a difference between the sequential frames by comparing pixel values of a reference frame with corresponding pixel values in a subsequent frame; and
   storing information corresponding to the difference between the sequential frames.

4. The system as recited in claim 1, wherein the operations further comprise generating a video summarization from the first video data, the video summarization including a video segment that includes at least the first frame of the first video data and the second frame of the first video data and being of a duration that is less than a total duration of the first video data.

5. A method comprising:
   under control of one or more processors:
      receiving first video data captured by a first imaging sensor of a video capture device, wherein receiving the first video data includes receiving a first set of image frames;
      receiving second video data captured by a second imaging sensor of the video capture device, wherein receiving the second video data includes receiving a second set of image frames;
      receiving motion data of the video capture device during capture of the first video data and the second video data;
      calculating, based at least in part on the motion data, one or more motion vectors that correspond to movement of the first imaging sensor of the video capture device;
      applying, based at last in part on the one or more motion vectors, a motion compensation algorithm to the first video data to generate one or more motion stabilizing adjustments used to compress and encode the first video data by:
         determining that a location change of a pixel value from a first location in a first frame of the first set of frame images to a second location in a second frame of the first set of images corresponds to the one or more motion vectors;
         determining that the location change is greater than a predetermined amount; and
         storing information regarding the first location based at least in part on determining that the location change is greater than the predetermined amount; and
      applying, based at least in part on the one or more motion vectors, the motion stabilizing adjustments to the second video data to compress and encode the second video data.

6. The method as recited in claim 5, further comprising determining that the first imaging sensor of the video capture device and the second imaging sensor of the video capture device are disposed in a fixed coaxial relationship such that a first field of view associated with the first imaging sensor is approximately 180 degrees from a second field of view associated with the second imaging sensor.

7. The method as recited in claim 5, further comprising determining that the motion data is created by an inertial motion sensor of the video capture device and, wherein receiving the motion data includes receiving a rotational movement of the video capture device.

8. The method as recited in claim 5, further comprising associating the motion data with the first set of image frames based at least partly on motion time stamp information associated with the motion data and imaging time stamp information associated with the first set of image frames.

9. The method as recited in claim 5, further comprising:
   receiving third video data captured by a third imaging sensor of the video capture device, wherein receiving the third video data includes receiving a third set of image frames of the third video data;
   receiving fourth video data captured by a fourth imaging sensor of the video capture device, wherein receiving the fourth video data includes receiving a fourth set of image frames of the fourth video data;
   calculating, based at least in part on the motion data, one or more second motion vectors that correspond with movement of the third imaging sensor of the video capture device;
   applying, based on the one or more second motion vectors, the motion compensation algorithm to the third video data to compress and encode the third video data; and
   applying, based at least in part on the one or more second motion vectors, the motion compensation algorithm to the fourth video data to compress and encode the fourth video data.

10. The method as recited in claim 9, further comprising creating a panoramic video by:
    stitching the first set of image frames with the second set of image frames;
    stitching the second set of image frames with the third set of image frames;
    stitching the third set of image frames with the fourth set of image frames; and
    stitching the fourth set of image frames with the first set of image frames.

11. The method as recited in claim 9, further comprising applying, based at least in part on the one or more motion vectors, a video stabilization algorithm to the first video data, the second video data, the third video data, and the fourth video data.

12. The method as recited in claim 11, wherein applying the video stabilizing algorithm includes:
    calculating a global motion vector based at least partly on a rotational motion of the video capture device; and
    estimating a displacement of pixel values within sequential frames of the first video data.

13. The method as recited in claim 5, wherein applying the motion compensation algorithm to the first video data includes applying the motion compensation algorithm to a portion of the first video data to compress and encode the portion of the first video data.

14. The method as recited in claim 5, further comprising determining metadata associated with the first set of image frames, wherein determining metadata associated with the first set of image frames includes determining at least one of a time stamp associated with the first video data, a frame number associated with the first video data, an identity of the first imaging sensor, video capture settings of the first imaging sensor, or a focal length associated with the first imagine sensor.

15. A system comprising:
    memory;
    one or more processors; and
    one or more computer-executable instructions stored in the memory and executable by the one or more processors to perform operations comprising:
       receiving first video data captured by a first imaging sensor of a video capture device, wherein receiving the first video data includes receiving a first reference frame and a first subsequent frame of the first video data;
       receiving second video data captured by a second imaging sensor of the video capture device, wherein receiving the second video data includes receiving a second reference frame and a second subsequent frame of the second video data;
       receiving motion data indicating movement of the first imaging sensor from a first position to a second position;
       calculating, based on the motion data, one or more first motion vectors that correspond with the movement of the first imaging sensor from the first position to the second position;
       determining, based at least in part on the one or more first motion vectors, a first difference in first pixel value locations between the first reference frame and the first subsequent frame;
       determining that the first difference is greater than a predetermined amount;
       storing, based at least in part on determining that the first difference is greater than the predetermined amount, information regarding a location of a pixel value in the first reference frame;
       determining, based at least in part on the one or more first motion vectors, a second difference in second pixel value locations between the second reference frame and the second subsequent frame; and
       stitching together the first video data and the second video data to create a panoramic video.

16. The system as recited in claim 15, wherein the operations further comprise receiving, from a motion sensor associated with the video capture device, rotational motion data related to a motion of the video capture device.

17. The system as recited in claim 15, wherein the operations further comprise:
    receiving third video data captured by a third imaging sensor of the video capture device, wherein receiving the third video data includes receiving a third reference frame and a third subsequent frame of the third video data;
    receiving fourth video data captured by a fourth imaging sensor of the video capture device, wherein receiving the fourth video data includes receiving a fourth reference frame and a fourth subsequent frame of the fourth video data;
    receiving additional motion data indicating additional movement of the third imaging sensor from a third position to a fourth position;
    calculating, based on the additional motion data, one or more second motion vectors that correspond with additional movement of the third imaging sensor from the third position to the fourth position;
    determining, based at least in part on the one or more second motion vectors, a third difference in third pixel value locations between the third reference frame and the third subsequent frame;

determining, based at least in part on the one or more second motion vectors, a fourth difference in pixel value locations between the fourth reference frame and the fourth subsequent frame; and stitching together the third video data and the fourth video data with the first video data and the second video data to create the panoramic video.

18. The system as recited in claim 15, wherein the operations further comprise compressing the first video data by refraining from storing information associated with the first subsequent frame based at least in part on determining that the first difference is greater than the predetermined threshold.

19. The system as recited in claim 15, wherein determining the first difference in the first pixel value locations includes executing an algorithm that tracks a block of pixel value locations between the first reference frame and the first subsequent frame in the first video data and shifts the block of pixel value locations in the first subsequent frame based upon the one or more first motion vectors.

20. The method of claim 5, further comprising refraining, based at least in part on the location change being greater than the predetermined threshold, from storing information associated with the second frame.

* * * * *